United States Patent
Shinoda

(10) Patent No.: US 9,579,563 B2
(45) Date of Patent: Feb. 28, 2017

(54) GAME SYSTEM, INFORMATION STORAGE MEDIUM AND GAME PROECSSING METHOD

(71) Applicant: BANDAI NAMCO ENTERTAINMENT INC., Tokyo (JP)

(72) Inventor: Tetsuya Shinoda, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 456 days.

(21) Appl. No.: 14/162,283

(22) Filed: Jan. 23, 2014

(65) Prior Publication Data

US 2014/0221062 A1   Aug. 7, 2014

(30) Foreign Application Priority Data

Feb. 5, 2013   (JP) .................. 2013-020945

(51) Int. Cl.
| | |
|---|---|
| A63F 13/00 | (2014.01) |
| A63F 9/24 | (2006.01) |
| A63F 13/30 | (2014.01) |
| A63F 13/40 | (2014.01) |
| A63F 13/803 | (2014.01) |
| A63F 13/34 | (2014.01) |

(Continued)

(52) U.S. Cl.
CPC ............. *A63F 13/12* (2013.01); *A63F 13/10* (2013.01); *A63F 13/335* (2014.09); *A63F 13/34* (2014.09); *A63F 13/803* (2014.09); *A63F 13/847* (2014.09)

(58) Field of Classification Search
CPC .......... A63F 13/00; A63F 13/06; A63F 13/10; A63F 13/40; A63F 13/42; A63F 13/422; A63F 13/426; A63F 13/44; A63F 13/45; A63F 13/497; A63F 13/52; A63F 13/803
See application file for complete search history.

(56) References Cited

U.S. PATENT DOCUMENTS 7,789,741 B1 *  9/2010  Fields ..................... A63F 13/10 463/2
2003/0207704 A1 * 11/2003  Takahashi ............... A63F 13/10 463/1

(Continued)

FOREIGN PATENT DOCUMENTS

JP  A-2000-342855   12/2000
JP  B2-3643512       4/2005

*Primary Examiner* — Milap Shah
(74) *Attorney, Agent, or Firm* — Oliff PLC

(57) ABSTRACT

A game system can implements a multiplayer game. The game system includes: a union event processing section that disposes a united object in an object space instead of player objects respectively operated by a plurality of players when a union event has occurred, and sets the plurality of players to a cooperative play state; an individual play processing section that controls the player objects respectively operated by the plurality of players based on input information input by each of the plurality of players; and a cooperative play processing section that controls the united object based on the input information input by the plurality of players, the union event processing section determining a relative advantage of positions of the player objects respectively operated by the plurality of players before occurrence of the union event, and determining a placement position of the united object based on determination results.

18 Claims, 15 Drawing Sheets

(51) Int. Cl.
  *A63F 13/847* (2014.01)
  *A63F 13/335* (2014.01)

(56) References Cited

U.S. PATENT DOCUMENTS

2006/0116186 A1* 6/2006 Sawada ................ A63F 13/10
                                            463/4
2010/0304858 A1* 12/2010 Asuke .................. A63F 13/10
                                            463/31

* cited by examiner

FIG.7A

| PLAYER IDENTIFICATION INFORMATION | PLAYER OBJECT INFORMATION | TEAMMATE INFORMATION | COOPERATIVE PLAY FLAG | UNION FLAG | UNITED CART INFORMATION | ITEM INFORMATION | RANKING |
|---|---|---|---|---|---|---|---|
| P00001 | POB01 | P00002 | ON/OFF | ON/OFF | UNITED CART NO. 3 | | |
| P00002 | POB02 | P00001 | ON/OFF | ON/OFF | UNITED CART NO. 1 | | |

| MOVING OBJECT IDENTIFICATION INFORMATION | POSITION COORDINATES |
|---|---|
| POB01 | $(l_{p1}, w_{p1})$ |
| POB02 | $(l_{p2}, w_{p2})$ |
| GOB01 | $(l_{g1}, w_{g1})$ |

410　420

400

GAME SYSTEM, INFORMATION STORAGE MEDIUM AND GAME PROECSSING METHOD

Japanese Patent Application No. 2013-020945, filed on Feb. 5, 2013, is hereby incorporated by reference in its entirety.

BACKGROUND OF THE INVENTION

The present invention relates to a game system, an information storage medium, and a game processing method.

An online multiplayer battle game has been known, such as a game that allows a plurality of players to enjoy match play by operating their respective player characters (e.g., a vehicular character such as an automobile) in a single virtual space using a game device to fight against each other, and a game that allows a plurality of players to enjoy cooperative play by fighting against a computer character (enemy character) in cooperation. For example, the game systems disclosed in JP-A-2000-342855 and Japanese Patent No. 3643512 are known.

However, such cooperative play is normally designed so that each player operates only his character, and fights against the enemy character within its ability instead of employing a configuration in which the player characters are united to generate a single united character. Therefore, the strength of each character is reflected in the game, and the players cannot sufficiently enjoy cooperative play.

It is difficult to apply cooperative play to a competitive game such as a racing game, and only a limited number of games have been proposed in which a skilled player assists an inexperienced player.

SUMMARY

Several aspects of the invention may provide a game system, an information storage medium, and a game processing method that allow a skilled player to assist an inexperienced player, and allow the players to enjoy cooperative play.

According to a first aspect of the invention, there is provided a game system that can implement a multiplayer game, the game system comprising:

a union event processing section that disposes a united object in an object space instead of player objects respectively operated by a plurality of players when a union event has occurred, and sets the plurality of players to a cooperative play state;

an individual play processing section that controls the player objects respectively operated by the plurality of players based on input information input by each of the plurality of players when the plurality of players are not set to the cooperative play state; and a cooperative play processing section that controls the united object based on the input information input by the plurality of players when the plurality of players are set to the cooperative play state, the union event processing section determining a relative advantage of positions of the player objects respectively operated by the plurality of players before occurrence of the union event, and determining a placement position of the united object based on determination results.

According to a second aspect of the invention, there is provided a non-transitory information storage medium storing a program for implementing a multiplayer game, the program causing a computer to function as:

a union event processing section that disposes a united object in an object space instead of player objects respectively operated by a plurality of players when a union event has occurred, and sets the plurality of players to a cooperative play state;

an individual play processing section that controls the player objects respectively operated by the plurality of players based on input information input by each of the plurality of players when the plurality of players are not set to the cooperative play state; and a cooperative play processing section that controls the united object based on the input information input by the plurality of players when the plurality of players are set to the cooperative play state, the union event processing section determining a relative advantage of positions of the player objects respectively operated by the plurality of players before occurrence of the union event, and determining a placement position of the united object based on determination results.

According to a third aspect of the invention, there is provided a game processing method for implementing a multiplayer game, the game processing method comprising:

a union event processing step that disposes a united object in an object space instead of player objects respectively operated by a plurality of players when a union event has occurred, and sets the plurality of players to a cooperative play state;

an individual play processing step that controls the player objects respectively operated by the plurality of players based on input information input by each of the plurality of players when the plurality of players are not set to the cooperative play state; and a cooperative play processing step that controls the united object based on the input information input by the plurality of players when the plurality of players are set to the cooperative play state, the union event processing step determining a relative advantage of positions of the player objects respectively operated by the plurality of players before occurrence of the union event, and determining a placement position of the united object based on determination results.

BRIEF DESCRIPTION OF THE SEVERAL VIEWS OF THE DRAWING

FIGS. 7A and 7B illustrate game data.

Figure 1:
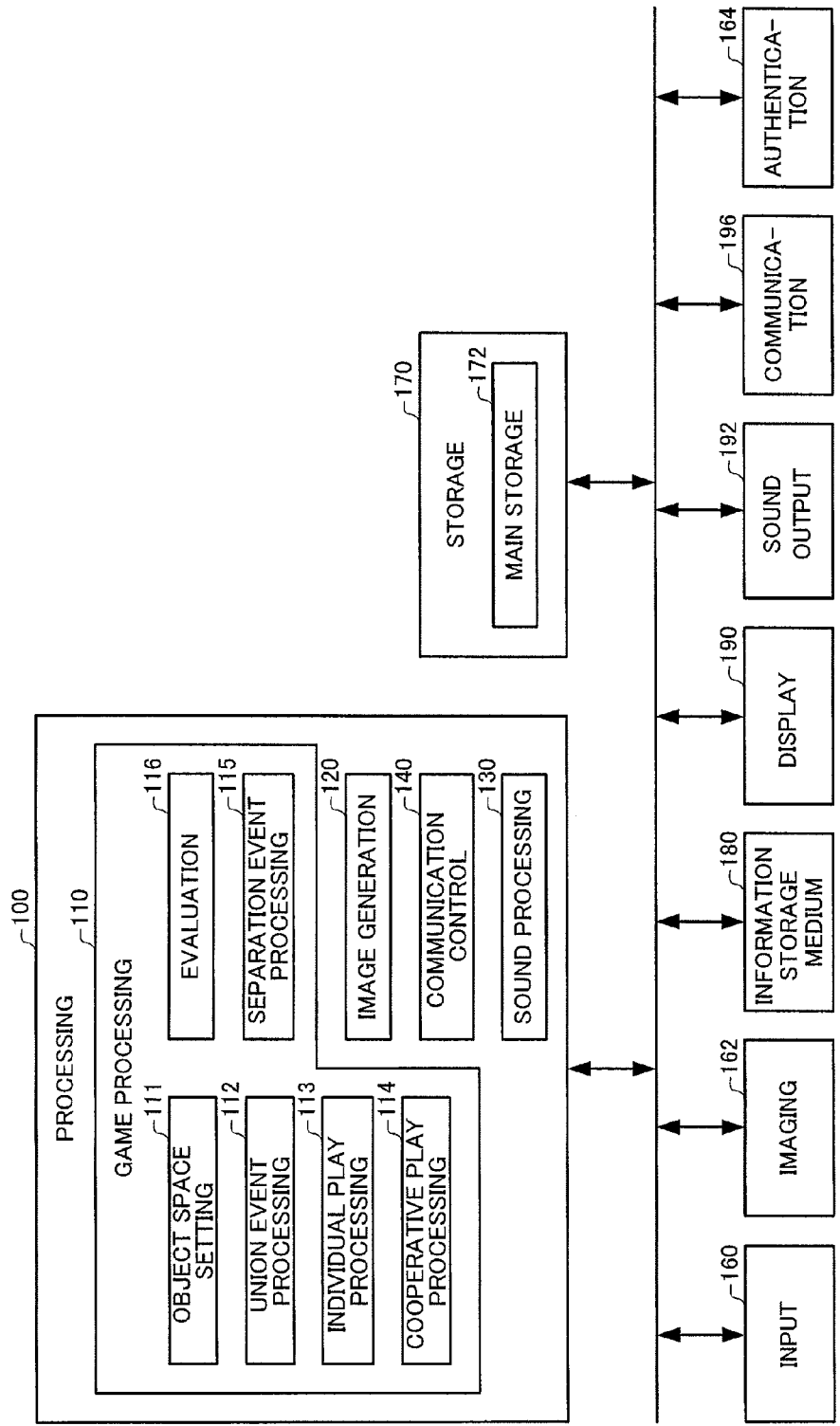
FIG. 1 is a functional block diagram illustrating a game system (image generation system) according to the first embodiment of the invention.

DETAILED DESCRIPTION OF THE EMBODIMENT (1) According to one embodiment of the invention, there is provided a game system that can implement a multiplayer game, the game system including:

a union event processing section that disposes a united object in an object space instead of player objects respectively operated by a plurality of players when a union event has occurred, and sets the plurality of players to a cooperative play state;

an individual play processing section that controls the player objects respectively operated by the plurality of players based on input information input by each of the plurality of players when the plurality of players are not set to the cooperative play state; and a cooperative play processing section that controls the united object based on the input information input by the plurality of players when the plurality of players are set to the cooperative play state, the union event processing section determining a relative advantage of positions of the player objects respectively operated by the plurality of players before occurrence of the union event, and determining a placement position of the united object based on determination results.

Another embodiment of the invention relates to a server that includes the above sections. Yet another embodiment of the invention relates to a program that causes a computer to function as the above sections. Still another embodiment of the invention relates to a computer-readable information storage medium storing the above program.

According to one embodiment of the invention, there is provided a game processing method for implementing a multiplayer game, the game processing method comprising:

a union event processing step that disposes a united object in an object space instead of player objects respectively operated by a plurality of players when a union event has occurred, and sets the plurality of players to a cooperative play state;

an individual play processing step that controls the player objects respectively operated by the plurality of players based on input information input by each of the plurality of players when the plurality of players are not set to the cooperative play state; and a cooperative play processing step that controls the united object based on the input information input by the plurality of players when the plurality of players are set to the cooperative play state, the union event processing step determining a relative advantage of positions of the player objects respectively operated by the plurality of players before occurrence of the union event, and determining a placement position of the united object based on determination results.

The union event processing section may determine the placement position of the united object based on relative advantage determination results, or the most advantageous position of the player object among the player objects respectively operated by the plurality of players, or the position of the player object that is advantageous with respect to a specific criterion.

The term "cooperative play (state)" refers to play (play state) in which a plurality of players operate the united object in cooperation. The united object is controlled based on the input information input by the plurality of players during the cooperative play.

A plurality of players who perform the cooperative play may be linked in advance as a team before the game starts, or may be linked as a team when a given condition has been satisfied during the game, or may be randomly linked as a team. The player object is an object that moves in the game space. The player object may be a moving object or a character object, for example.

When controlling the united object based on the input information input by a plurality of players during the cooperative play, the plurality of players may control the functions, the movement/operation, and the like of the united object in a sharing manner. The functions, the movement/operation, and the like of the united object may be controlled using the average value of the input information input by a plurality of players, or the average value of the input information input by a plurality of players that is weighted using a given weight. The united object may be controlled using the most appropriate input information among the input information input by a plurality of players.

The relative advantage of the position of the player object is determined depending on the characteristics of the game. For example, when the game is a racing game, the preceding position is an advantageous position in the game. When the game is a shooting game, a safe position, a position where a number of targets exist, or a position where a number of weak enemies exist is an advantageous position in the game.

According to the above embodiments, since the position of the united object is determined based on the relative advantage determination results for the plurality of player objects, the position of an inexperienced player can be drawn to the position of a skilled player among the plurality of players. It is possible to provide a game in which an inexperienced player can comfortably enjoy the game in the same manner as a skilled player through the cooperative play.

(2) In each of the game system, the server, the program, the information storage medium, and the game processing method, the union event processing section may determine a parameter or an item of the united object based on a parameter or an item of at least one player among the plurality of players.

For example, the parameter or the item of the united object may be determined based on the most advantageous parameter or item of the plurality of players. In this case, the players can perform the cooperative play under the most advantageous conditions for the players.

The union event processing section may determine the performance of the united object based on points possessed by at least one player among the plurality of players, or the performance of the player object.

(3) In each of the game system, the server, the program, the information storage medium, and the game processing method, the cooperative play processing section may assign a different role of controlling at least one of movement and operation of the united object respectively to the plurality of players, and control at least one of the movement and the operation of the united object corresponding to the role assigned to each of the plurality of players based on the input information input by each of the plurality of players.

For example, when the united object has a plurality of different functions (e.g., moving function and attack function), the role of controlling a different function may respectively be assigned to each player.

(4) Each of the game system, the server, the program, the information storage medium, and the game processing method may further include: a separation event processing section that cancels the cooperative play state of the plurality of players when a separation event has occurred in a state in which the plurality of players are set to the cooperative play state, and disposes the player objects respectively operated by the plurality of players in the object space instead of the united object.

(5) In each of the game system, the server, the program, the information storage medium, and the game processing method, the separation event processing section may generate the separation event when a given time has elapsed after occurrence of the union event.

(6) In each of the game system, the server, the program, the information storage medium, and the game processing method, the union event processing section may generate the union event based on the input information input by a player among the plurality of players.

(7) In each of the game system, the server, the program, the information storage medium, and the game processing method, the player objects and the united object may be moving objects, the multiplayer game may be a racing game in which a plurality of moving objects move on a racetrack within the object space, and the game system may further include: a moving object control section that moves the plurality of moving objects in a game space based on travel performance set to the plurality of moving objects; and a positional relationship determination section that determines a positional relationship between the plurality of moving objects in the game space.

(8) In each of the game system, the server, the program, the information storage medium, and the game processing method, the cooperative play processing section may control movement of the united object based on the input information input by a player among the plurality of players, and control an attack operation of the united object based on the input information input by another player among the plurality of players.

For example, the attack operation of the united object may be controlled based on the input information input by the player who has caused the union event to occur, and the movement of the united object may be controlled based on the input information input by another player.

(9) In each of the game system, the server, the program, the information storage medium, and the game processing method, the positional relationship determination section may determine that the plurality of players have reached a goal at the same time when the united object has reached the goal during the racing game.

(10) In each of the game system, the server, the program, the information storage medium, and the game processing method, the separation event processing section may determine the positions of the player objects respectively operated by the plurality of players after occurrence of the separation event based on the position of the united object when the separation event has occurred, and relative ranking of the player objects respectively operated by the plurality of players before occurrence of the union event.

(11) Each of the game system, the server, the program, the information storage medium, and the game processing method may further include: an evaluation section that evaluates play of each of the plurality of players with respect to control of the united object in the cooperative play state, and the separation event processing section may determine the positions of the player objects respectively operated by the plurality of players after occurrence of the separation event based on the position of the united object when the separation event has occurred, and an evaluation result for the play of each of the plurality of players in the cooperative play state.

The relative ranking of the player object after occurrence of the separation event may be increased when the play of the player during the cooperative play is highly evaluated.

(12) In each of the game system, the server, the program, the information storage medium, and the game processing method, the union event processing section may generate the union event when the game is executed in a given mode.

For example, when one of a plurality of modes can be selected when starting the game, the union event may be generated when a first mode (e.g., cooperative play mode) has been selected, and may not be generated when a second mode (e.g., normal play mode) has been selected.

Exemplary embodiments of the invention are described below. Note that the following exemplary embodiments do not unduly limit the scope of the invention as stated in the claims. Note also that all of the elements described in connection with the following exemplary embodiments below should not necessarily be taken as essential elements of the invention.

1. Configuration According to First Embodiment

A first embodiment illustrates the configuration of a game system that determines the position of a player object after occurrence of a separation event based on the relative position of the player object before occurrence of a union event.

FIG. 1 illustrates an example of a functional block diagram of a game system (image generation system) according to the first embodiment. Note that the game system according to the first embodiment may have a configuration in which some of the elements (sections) illustrated in FIG. 1 are omitted.

An input section 160 allows the player to input moving object operation data. The function of the input section 160 may be implemented by a lever, a button, a steering wheel, a microphone, a touch panel display, a casing, or the like.

The input section 160 may be an input device that includes an acceleration sensor that detects triaxial accelerations, a gyrosensor that detects angular velocity, and an imaging section. For example, the input device may be operated by the player in a state in which the input device is held or worn by the player. The term "input device" used herein includes a controller that imitates a tool such as a sword-type controller or a gun-type controller that is held by the player, or a glove-type controller that is worn by the player. The term "input device" used herein also includes an image generation device, a portable image generation device, a mobile phone, or the like that is integrated with the input device.

An authentication section 164 acquires identification information about the player. The authentication section 164 may be implemented by hardware (e.g., an antenna or a reader/writer that communicates with a contactless IC card provided with a contactless communication IC chip via contactless communication), for example. The contactless communication IC chip is an IC chip that utilizes a contactless IC card technique. A carrier is transmitted from the reader/writer to supply electricity to the IC chip via electromagnetic induction, and communication is performed between the reader/writer and the IC chip through carrier modulation.

An imaging section 162 captures an object. The function of the imaging section 162 may be implemented by an image sensor (e.g., CCD or CMOS sensor) and an optical system (e.g., lens). Imaging information (captured image data) acquired by the imaging section 162 is stored in a storage section. An image of the player captured by the imaging section 162 may be used as a marker.

A storage section 170 serves as a work area for a processing section 100, a communication section 196, and the like. The function of the storage section 170 may be implemented by a RAM (DRAM or VRAM) or the like. The storage section 170 stores a game program and game data necessary for executing the game program.

An information storage medium 180 (computer-readable medium) stores a program, data, and the like. The function of the information storage medium 180 may be implemented by an optical disk (e.g., DVD or CD), a hard disk drive (HDD), a memory (e.g., ROM), or the like. The processing section 100 performs various processes according to the first embodiment based on a program (data) stored in the information storage medium 180. Specifically, a program that causes a computer (i.e., a device that includes an input section, a processing section, a storage section, and an output section) to function as each section according to the first embodiment (i.e., a program that causes a computer to perform the process of each section) is stored in the information storage medium 180.

A display section 190 outputs an image generated according to the first embodiment. The function of the display section 190 may be implemented by an LCD, an organic EL display, a CRT, a touch panel display, a head-mounted display (HMD), or the like.

A sound output section 192 outputs sound generated according to the first embodiment. The function of the sound output section 192 may be implemented by a speaker, a headphone, or the like.

The communication section 196 controls communication with the outside (e.g., another image generation device). The function of the communication section 196 may be implemented by hardware such as a processor or a communication ASIC, a program, or the like.

Note that the game system may receive a program and data that cause a computer to function as each section according to the first embodiment from an information storage medium or a storage section included in a server through a network, and store the received program and data in the information storage medium 180 or the storage section 170. A case where the image generation device is operated based on a program (data) received from the server is also included within the scope of the invention.

The processing section 100 (processor) performs a game process, an image generation process, a sound generation process, a communication control process, and the like based on input information from the input section 160, a program, and the like.

The processing section 100 performs various processes using a main storage section 172 included in the storage section 170 as a work area. The function of the processing section 100 may be implemented by hardware such as a processor (e.g., CPU, GPU, or DSP) or an ASIC (e.g., gate array), or may be implemented by a program.

The processing section 100 includes a game processing section 110, an image generation section 120, a sound processing section 130, and a communication control section 140. Note that the processing section 100 may have a configuration in which some of these sections are omitted.

The game processing section 110 performs various game processes. The game processing section 110 includes an object space setting section 111, a union event processing section 112, an individual play processing section 113, a cooperative play processing section 114, a separation event processing section 115, and an evaluation section 116.

The object space setting section 111 disposes a display object (e.g., character (enemy object), building, stadium, car, tree, pillar, wall, or map (topography)) in an object space.

The term "object space" used herein refers to a virtual three-dimensional space. The term "three-dimensional space" used herein refers to a space in which an object is disposed at three-dimensional coordinates (X, Y, Z), for example.

For example, the object space setting section 111 disposes an object (i.e., an object formed by a primitive such as a polygon, a free-form surface, or a subdivision surface) in a world coordinate system when the object space is a three-dimensional space. For example, the object space setting section 111 determines the position and the rotation angle (synonymous with orientation or direction) of the object in the world coordinate system, and disposes the object at the determined position (X, Y, Z) at the determined rotation angle (rotation angles around the X, Y, and Z-axes).

The union event processing section 112 disposes a united object in the object space instead of player objects respectively operated by a plurality of players when a union event has occurred, and sets the plurality of players to a cooperative play state. The individual play processing section 113 controls the player objects respectively operated by the plurality of players based on input information input by each of the plurality of players when the plurality of players are not set to the cooperative play state. The cooperative play processing section 114 controls the united object based on the input information input by the plurality of players when the plurality of players are set to the cooperative play state. The union event processing section 112 determines the relative advantage of the positions of the player objects respectively operated by the plurality of players before occurrence of the union event, and determines the placement position of the united object based on the determination results.

The union event processing section 112 may determine a parameter or an item of the united object based on a parameter or an item of at least one player among the plurality of players.

The cooperative play processing section 114 may assign a different role of controlling at least one of movement and operation of the united object respectively to the plurality of players, and control at least one of the movement and the operation of the united object corresponding to the role assigned to each of the plurality of players based on the input information input by each of the plurality of players.

The union event processing section 112 may determine the performance of the united object based on points possessed by at least one player among the plurality of players, or the performance of the player object.

The separation event processing section 115 may cancel the cooperative play state of the plurality of players when a separation event has occurred in a state in which the plurality of players are set to the cooperative play state, and dispose the player objects respectively operated by the plurality of players in the object space instead of the united object.

The separation event processing section 115 may generate the separation event when a given time has elapsed after occurrence of the union event.

The union event processing section 112 may generate the union event based on the input information input by a player among the plurality of players.

The player objects and the united object may be moving objects, the multiplayer game may be a racing game in which a plurality of moving objects move on a racetrack within the object space, and the game system may further include a moving object control section (not illustrated in the drawings) that moves the plurality of moving objects in a game space based on travel performance set to the plurality of moving objects, and a positional relationship determination section (not illustrated in the drawings) that determines a positional relationship between the plurality of moving objects in the game space.

The cooperative play processing section 114 may control the movement of the united object based on the input information input by a player among the plurality of players, and control an attack operation of the united object based on the input information input by another player among the plurality of players.

The positional relationship determination section (not illustrated in the drawings) may determine that the plurality of players have reached a goal at the same time when the united object has reached the goal during the racing game.

The separation event processing section 115 may determine the positions of the player objects respectively operated by the plurality of players after occurrence of the separation event based on the position of the united object when the separation event has occurred, and the relative ranking of the player objects respectively operated by the plurality of players before occurrence of the union event.

The evaluation section 116 may evaluate the play of each of the plurality of players with respect to control of the united object in the cooperative play state, and the separation event processing section 115 may determine the positions of the player objects respectively operated by the plurality of players after occurrence of the separation event based on the position of the united object when the separation event has occurred, and an evaluation result for the play of each of the plurality of players in the cooperative play state.

The union event processing section 112 may generate the union event when the game is executed in a given mode.

The image generation section 120 performs a drawing process based on the results of various processes (game process and simulation process) performed by the processing section 100 to generate an image, and outputs the generated image to the display section 190. Specifically, the image generation section 120 performs a geometric process such as coordinate transformation (world coordinate transformation or camera coordinate transformation), clipping, perspective transformation, and a light source process, and generates drawing data (e.g. primitive surface vertex position coordinates, texture coordinates, color data, normal vector, and alpha-value) based on the processing results. The image generation section 120 draws an object (one or more primitive surfaces) subjected to perspective transformation (geometric process) in a drawing buffer (i.e., a buffer that can store image information on a pixel basis (e.g., frame buffer or work buffer)) based on the drawing data (primitive surface data). The image generation section 120 thus generates an image viewed from a virtual camera (given viewpoint) within the object space. The image generation section 120 may also perform a vertex process and a pixel process.

The image generation section 120 controls the virtual camera (viewpoint) for generating an image viewed from a given (arbitrary) viewpoint within the object space. Specifically, the image generation section 120 controls the position (X, Y, Z) or the rotational angle (e.g., the rotational angle of the virtual camera when the virtual camera is rotated clockwise around each of the X, Y, and Z axes) of the virtual camera in the world coordinate system when generating a three-dimensional image. Specifically, the image generation section 120 controls the viewpoint position, the line-of-sight direction, and the angle of view. The image generation section 120 may rotate the virtual camera by a predetermined rotation angle. In this case, the image generation section 120 controls the virtual camera based on virtual camera data that specifies the position or the rotational angle of the virtual camera. When a plurality of virtual cameras (viewpoints) are provided, the image generation section 120 performs the above control process corresponding to each virtual camera.

For example, the image generation section 120 may generate an image based on a first-person viewpoint (e.g., front viewpoint or driver's viewpoint), or may generate an image based on a third-person viewpoint (e.g., rear viewpoint or downward viewpoint).

The sound processing section 130 performs a sound process based on the results of various processes performed by the processing section 100 to generate a game sound (e.g., background music (BGM), effect sound, or voice), and outputs the generated game sound to the sound output section 192.

The communication control section 140 generates a packet transmitted to another game system, designates the network address of the packet destination game system, stores the received packet in the storage section 170, analyzes the received packet, and controls the communication section 196 relating to another packet transmission/reception process, for example. In the first embodiment, the communication control section 116 generates a data packet and a command packet necessary for executing the racing game via a network (e.g., Internet), and causes the communication section 196 to transmit and receive the data packet and the command packet.

A program (data) that causes a computer to function as each section according to the first embodiment may be distributed to the information storage medium 180 (storage section 170) from an information storage medium included in a host device (server) through a network and the communication section 196. Use of the information storage medium included in the host device (server) is also included within the scope of the invention.

The image generation system according to the first embodiment is a system provided with a multi-player mode that allows a plurality of players to play the game. The image generation system may be provided with a single-player mode that allows only one player to play the game. When a plurality of players play the game, a game image and game sound provided to each player may be generated using one terminal, or may be generated by a distributed process using a plurality of terminals (game devices or portable telephones) connected through a network (transmission line or communication line), for example.

The image generation system according to the first embodiment may be implemented by a server system. The server system may be implemented by a single server, or may be implemented by a plurality of servers (e.g., authentication server, game processing server, communication server, accounting server, and database server). In this case, the server system performs various processes based on operation information transmitted from one or a plurality of terminal devices (e.g., an arcade game device, a portable game device, or a mobile phone that can execute a program) connected to the server system through a network to generate image generation data for generating an image, and transmits the generated image generation data to each terminal device. Note that the image generation data refers to data for displaying an image generated by the method according to the first embodiment on each terminal device. The image generation data may be image data, or may be data (e.g., object data and game processing result data) that is used when each terminal device generates an image.

2. Configuration According to Second Embodiment

A second embodiment illustrates the configuration of a game system that determines the position of the player object after occurrence of the separation event based on the achievement by each player during the cooperative play.

Figure 2:
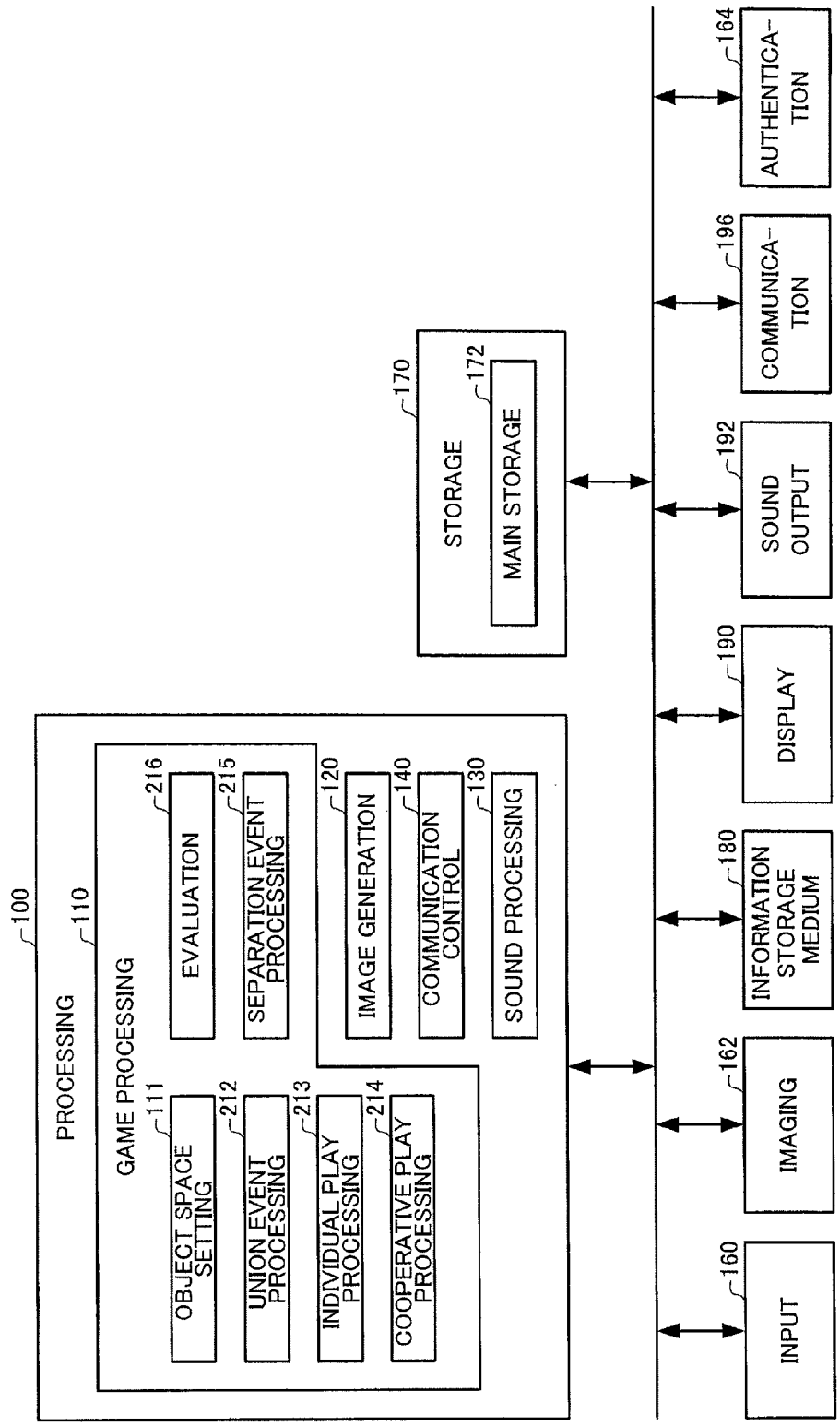
FIG. 2 is a functional block diagram illustrating a game system (image generation system) according to the second embodiment of the invention.

FIG. 2 illustrates an example of a functional block diagram of a game system (image generation system) according to the second embodiment. Note that the game system according to the second embodiment may have a configuration in which some of the elements (sections) illustrated in FIG. 2 are omitted. The sections (e.g., game processing section 110, object space setting section 111, input section 160, imaging section 162, storage section 170, main storage section 172, information storage medium 180, display section 190, sound output section 192, communication section 196, authentication section 164, image generation section 120, sound processing section 130, and communication control section 140) included in the game system according to the second embodiment the are configured in the same manner as described above in connection with the game system according to the first embodiment are indicated by the same reference signs, and description thereof is omitted.

The game processing section 110 performs various game processes. The game processing section 110 includes an object space setting section 111, a union event processing section 212, an individual play processing section 213, a cooperative play processing section 214, a separation event processing section 215, and an evaluation section 216.

The union event processing section 212 disposes a united object in the object space instead of player objects respectively operated by a plurality of players when a union event has occurred, and sets the plurality of players to a cooperative play state. The individual play processing section 213 controls the player objects respectively operated by the plurality of players based on input information input by each of the plurality of players when the plurality of players are not set to the cooperative play state. The cooperative play processing section 214 controls the united object based on the input information input by the plurality of players when the plurality of players are set to the cooperative play state. The separation event processing section 215 cancels the cooperative play state of the plurality of players when a separation event has occurred in a state in which the plurality of players are set to the cooperative play state, and disposes the player objects respectively operated by the plurality of players in the object space instead of the united object. The evaluation section 216 evaluates the play of each of the plurality of players with respect to control of the united object in the cooperative play state.

The separation event processing section 215 may determine at least one of the positions of the player objects respectively operated by the plurality of players after occurrence of the separation event, the parameter value of each player, the item of each player, and a bonus given to each player based on the evaluation result for the play of each of the plurality of players.

The cooperative play processing section 214 may assign a different role of controlling at least one of movement and operation of the united object respectively to the plurality of players, and control at least one of the movement and the operation of the united object corresponding to the role assigned to each of the plurality of players based on the input information input by each of the plurality of players.

The separation event processing section 215 may generate the separation event when a given time has elapsed after occurrence of the union event.

The union event processing section 212 may generate the union event based on the input information input by a player among the plurality of players.

The player objects and the united object may be moving objects, the multiplayer game may be a racing game in which a plurality of moving objects move on a racetrack within the object space, and the game system may further include a moving object control section (not illustrated in the drawings) that moves the plurality of moving objects in a game space based on travel performance set to the plurality of moving objects, and a positional relationship determination section (not illustrated in the drawings) that determines a positional relationship between the plurality of moving objects in the game space.

The cooperative play processing section 214 may control the movement of the united object based on the input information input by a player among the plurality of players, and control an attack operation of the united object based on the input information input by another player among the plurality of players.

3. Process 3-1. Outline of Game

The game system according to the embodiments of the invention (including the game system according to the first embodiment and the game system according to the second embodiment) is described below taking a multiplayer racing game as an example.

The game system according to the embodiments of the invention is a game system that executes a multiplayer game based on input information from a plurality of players. The multiplayer game may be implemented using a configuration in which a single game device receives input information from a plurality of players. The multiplayer game may be implemented using a configuration in which a plurality of game devices connected via a cable or wireless communication line exchange and share game data. The multiplayer game may also be implemented using a configuration in which a plurality of game terminals and a server are connected via a cable or wireless communication line, and the server receives and processes information input to each game terminal.

The game system according to the embodiments of the invention may be implemented by an arcade game system, or may be implemented by a consumer game device, or may be implemented by a personal computer or a portable terminal (e.g., mobile phone or smartphone).

The racing game according to the embodiments of the invention is designed so that a player object that is operated by the player travels on a racetrack set within a virtual game space (i.e., object space) based on input information input by the player, and competes with a player object operated by another player and a computer car. For example, when n players participate in the multiplayer game, player objects POB1, . . . , and POBn that are respectively operated by n players P1, . . . , and Pn, and a computer car that is controlled by the computer travel on the racetrack.

The racing game according to the embodiments of the invention is configured so that the player performs a shooting operation (i.e., an operation that causes the player object to shoot a shooting item during the game) while operating the player object (moving object). When the item shot by the player object has hit another moving object, the other moving object is damaged, or the travel of the other moving object is hindered.

3-2. Game Data

FIGS. 7A and 7B illustrate the game data according to the embodiments of the invention.

As illustrated in FIG. 7A, game data 300 that relates to the player includes player identification information 310, player object information 320, teammate information 330, a cooperative play flag 340, a union flag 350, a union cart information 360, item information 370, a ranking 380, and the like.

The player object information 320 is identification information about the player object operated by the player. The teammate information 330 is player identification information about a teammate who performs the cooperative play with the player in the cooperative play mode. Note that the teammate information 330 is unnecessary in a first example described later in which all of the participating players perform the cooperative play in the cooperative play mode. When a plurality of teams are present, or only some of the participating players perform the cooperative play, the teammate of the player can be determined from the teammate information 330.

The cooperative play flag 340 is a flag for determining whether or not the player performs the cooperative play. Note that the cooperative play flag 340 is unnecessary in the first example described later in which all of the participating players perform the cooperative play in the cooperative play mode. When only some of the participating players perform the cooperative play, whether or not the player performs the cooperative play can be determined from the cooperative play flag 340.

The union flag 350 is a flag that indicates whether the player is individually playing the game (union flag: OFF) or performing the cooperative play (union flag: ON).

The united cart information 360 is information about a united cart that is one type of item possessed by the player, and can be used when the player performs the cooperative play. The united cart that can be used when the player performs the cooperative play may be given based on the game history of the player, for example. Note that the game history of the player is stored in the server. The player may be authenticated before the game starts, and game history information about the player may be inquired of the server based on the player identification information.

A plurality of united carts that differ in performance may be provided, and a united cart among the plurality of united carts may be given to the layer as an item corresponding to the game history of the player. A united cart having better performance may be given to the player having better previous game results.

The item information 370 is information about an item possessed by the player. The item information 370 includes information about an item possessed by the player in advance, and information about an item given to the player during the game. In the embodiments of the invention, a shooting item, a union item, a union event generation item for generating the union event, and the like are given to the player. Information about these items may be stored as the item information 370. The ranking 380 indicates the ranking of the player. The ranking 380 may be updated every given frame based on position information about the moving object during the racing game.

As illustrated in FIG. 7B, position coordinates 420 of the moving object are managed as the moving object data 400, and linked to the moving object identification information 410. The position coordinates 420 of the moving object are coordinate values that indicate the position of the moving object on the racetrack. The position coordinates 420 may be indicated by the distance (l) from the start position and the position (w) in the widthwise direction of the racetrack.

3-3. Control of Player Object

Figure 5:
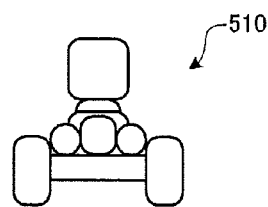
FIG. 5 illustrates an example of a player object disposed in a virtual game space.

FIG. 5 illustrates an example of a player object disposed in the virtual game space. The performance of a player object 510 may be set corresponding to the game history of the player, or may be set independently of the game history of the player.

The game history of the player may be stored in a game history data management server or the like as player information or game information that is linked to the player identification information.

Figure 6:
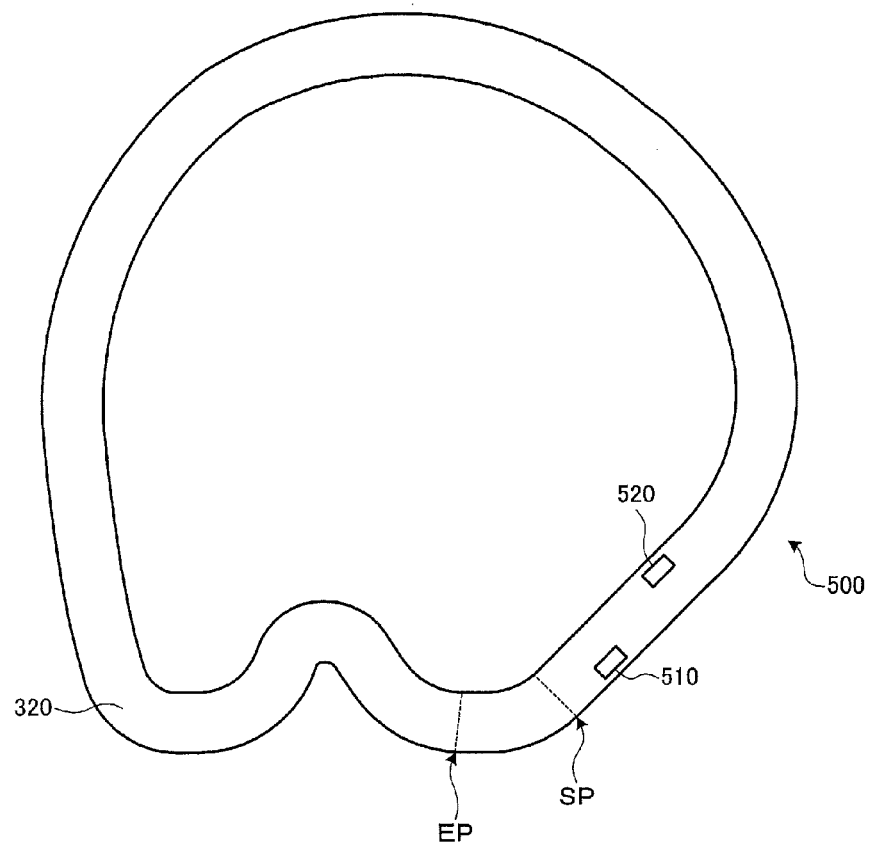
FIG. 6 illustrates an example of a racetrack set within a virtual game space.

FIG. 6 illustrates an example of a racetrack set within the virtual game space.

When the game started, a plurality of moving objects (e.g., player object and computer car) 510 and 520 leave a start point SP on a racetrack 500 illustrated in FIG. 6, and travel on the racetrack 500 aimed to reach a goal point EP. The movement of the player object 510 is controlled based on the input information input by the player so that the player object 510 travels on the racetrack 500 set within the virtual game space.

The player object 510 has a moving function (i.e., a function of moving on the racetrack) and a shooting function (i.e., a function of shooting a possessed shooting item). The movement and the shooting operation of the player object are controlled based on an operation input performed by the player.

For example, a steering wheel, a button, and the like may be provided to the input section, and the player may control the movement of the player object by operating the steering wheel, and control the shooting operation of the player object by pressing the button, for example.

Figure 8A:
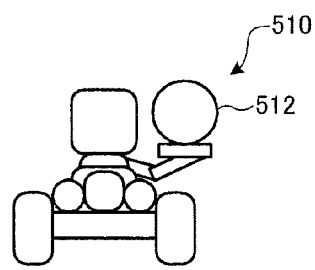
FIGS. 8A to 8C illustrate an item shooting operation performed by a player object.
Figure 8B:
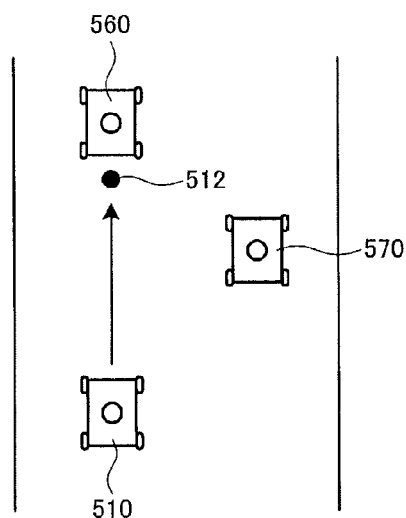
Figure 8C:
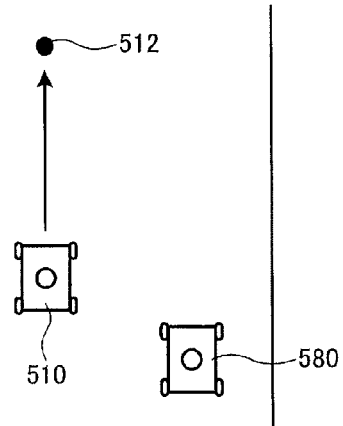

FIGS. 8A to 8C illustrate the item shooting operation of the player object (i.e., shooting function (i.e., attack function)). A shooting item 512 is given to the player when the game situation (e.g., the game parameter or the position of the player object) has satisfied a given condition. When the shooting item 512 has been given to the player, an image in which the player object 510 holds the shooting item 512 is generated (see FIG. 8A).

The player who possesses the shooting item 512 can shoot the shooting item 512 in the game space by pressing the button or the like at a desired timing.

When the shooting item 512 has hit another moving object (e.g., another player object or computer car), the other moving object is damaged, or the travel of the other moving object is hindered (i.e., the player can gain an advantage in the game). The moving path of the shooting item may be determined by the positional relationship between the player object 510 and another moving object or the like position that is positioned in front of the player object 510, or the moving direction of the player object.

For example, when the shooting item 512 has been shot in a state in which a second moving object 560 travels in front of the player object 510, and a third moving object 570 travels diagonally in front of the player object 510 (see FIG. 8B), the shooting item 512 may hit the second moving object 560 that travels in front of the player object 510 to hinder the travel of the second moving object 560.

For example, when the shooting item 512 has been shot in a state in which a fourth moving object 560 travels diagonally behind the player object 510 (see FIG. 8C), the shooting item 512 may not hit the moving object.

3-4. Cooperative Play Mode

The cooperative play (state) and the cooperative play mode according to the embodiments of the invention are described below.

The term "cooperative play (state)" refers to play (play state) in which a plurality of players operate a united object in cooperation. The united object is controlled based on the input information input by the plurality of players during the cooperative play.

A plurality of players who perform the cooperative play may be linked in advance as a team before the game starts, or may be linked as a team when a given condition has been satisfied during the game, or may be randomly linked as a team.

The term "cooperative play mode" refer to a state (mode) in which the cooperative play can be executed. When the mode is set to the cooperative play mode, the cooperative play can be performed when a given condition has been satisfied.

The cooperative play mode may be set on a game basis, or may be set on a player basis. When the cooperative play mode is set on a game basis, all of the players may participate in the cooperative play in the game in which the cooperative play mode is enabled. When the cooperative play mode is set on a player basis, only the players for whom the cooperative play mode is enabled may participate in the cooperative play. In the multiplayer game, only one team may perform the cooperative play, or a plurality of teams may perform the cooperative play. The number of players included in the team that performs the cooperative play may be two, or three or more.

A first example in which the cooperative play mode is set on a game basis is described below.

In the first example, all of the players who participate in the multiplayer game participate in the cooperative play when the cooperative play mode is enabled (i.e., only one team can perform the cooperative play when the cooperative play mode is enabled).

Figure 3:
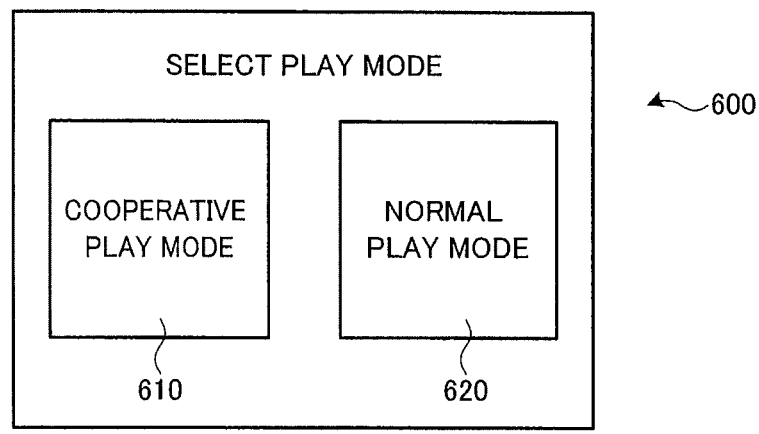
FIG. 3 illustrates an example of a mode selection screen in a first example.

FIG. 3 illustrates an example of a mode selection screen in the first example. A mode selection screen 600 illustrated in FIG. 3 is displayed before the game starts, and the player selects the cooperative play mode (see 610) or the normal play mode (see 620).

In this case, the cooperative play mode is enabled when all of the players who participate in the multiplayer game have selected the cooperative play mode (610). In the cooperative play mode, when a given condition has been satisfied during the game, all of the players who participate in the multiplayer game operate one united cart (i.e., united object) to enjoy the cooperative play.

For example, when two players P1 and P2 play the multiplayer game, and have selected the cooperative play mode (610), the players P1 and P2 form a team when a given condition has been satisfied (i.e., when a union event (described later) has occurred) during the game, and operate one united cart (i.e., united object) to compete with a computer car.

A second example in which the cooperative play mode is set on a player basis is described below. In the second example, some of the players who participate in the multiplayer game perform the cooperative play. In this case, when two or more players have selected the cooperative play mode (610) (see FIG. 3), only the players who have selected the cooperative play mode play the game in the cooperative play mode, and the players who have not selected the cooperative play mode play the game in the normal play mode.

For example, when two players P1 and P2 among four players P1, P2, P3, and P4 who play the multiplayer game have selected the cooperative play mode (610), and the players P3 and P4 have selected the normal play mode (620), the players P1 and P2 may form a team when a given condition has been satisfied (i.e., when a union event (described later) has occurred) during the game, and operate one united cart (i.e., united object) to compete with the players P3 and P4 and a computer car.

Figure 4:
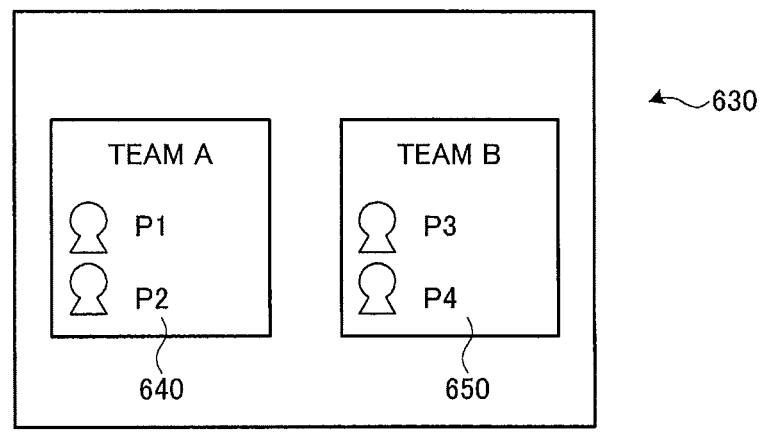
FIG. 4 illustrates an example of a team selection screen in a third example.

A third example in which one team or a plurality of teams that can perform the cooperative play in the cooperative play mode are set is described below. FIG. 4 illustrates an example of a team selection screen in the third example. In the third example, a team selection screen 630 illustrated in FIG. 4 is displayed. Each player selects a team A (see 640) or a team B (see 650), and the players who have selected an identical team perform the cooperative play as a team.

For example, when the players P1 and P2 among four players P1, P2, P3, and P4 who play the multiplayer game have selected the team A (640), and the players P3 and P4 have selected the team B (see 650), the players P1 and P2 may form the team A, and operate the united cart (i.e., united object) of the team A, and the players P3 and P4 may form the team B, and operate the united cart (i.e., united object) of the team B.

A fourth example in which the team that performs the cooperative play is dynamically set during the game when the cooperative play mode is enabled is described below. In the fourth example, the cooperative play mode is set on a game basis or a player basis, and the team is set according to a given rule during the game, or randomly set during the game. Therefore, the player is not notified of another player with whom the player performs the cooperative play until the union event occurs.

For example, a union event generation item may be given to a plurality of players who have satisfied a given condition during the game, and the plurality of players to whom the union event generation item has been given may form a team to perform the cooperative play when one of the plurality of players has issued a union event generation instruction.

For example, a player to whom the union event generation item has been given during the game may select a partner in the cooperative play.

3-5. Union Event

Figure 9:
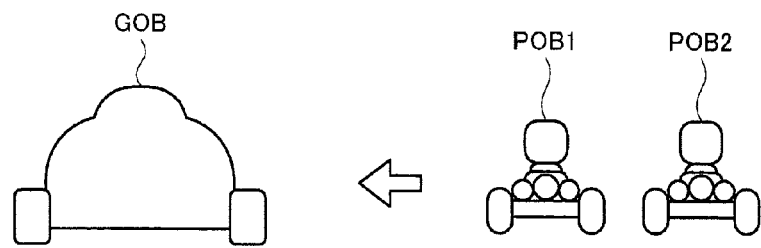
FIG. 9 illustrates a union event.

FIG. 9 illustrates the union event.

In the embodiments of the invention, when the union event has occurred, a united object appears instead of the player objects that have been operated by the players who form a team (i.e., a plurality of players) that performs the cooperative play, and the players who form the team operate the united object in cooperation. An example in which players P1 and P2 perform the cooperative play is described below. A player object POB1 operated by the player P1 and a player object POB2 operated by the player P2 independently travel on the racetrack within the virtual game space before the union event occurs. When the union event has occurred, a united object GOB is disposed on the racetrack within the virtual game space instead of the player object POB1 and the player object POB2. Specifically, the player object POB1 and the player object POB2 are united (integrated) when the union event has occurred to form the united object GOB.

The union event may be caused to occur based on the input information (e.g., an operation input that presses the button) input by the player. In the embodiments of the invention, the union event generation item is disposed on the racetrack within the virtual game space at a given timing. When the player object that travels on the racetrack has hit the union event generation item, the player can acquire the union event generation item. The player who has acquired the union event generation item can generate the union event by pressing a union event generation instruction button (or a shooting item shooting button or the like) at the desired timing.

For example, when the player object POB2 operated by the player P2 has hit the union event generation item, and the player who has acquired the union event generation item has generated the union event, the united object GOB is disposed on the racetrack instead of the player object POB1 operated by the player P1 and the player object POB2 operated by the player P2. The players P1 and P2 operate the united object in cooperation (cooperative play).

Figure 14A:
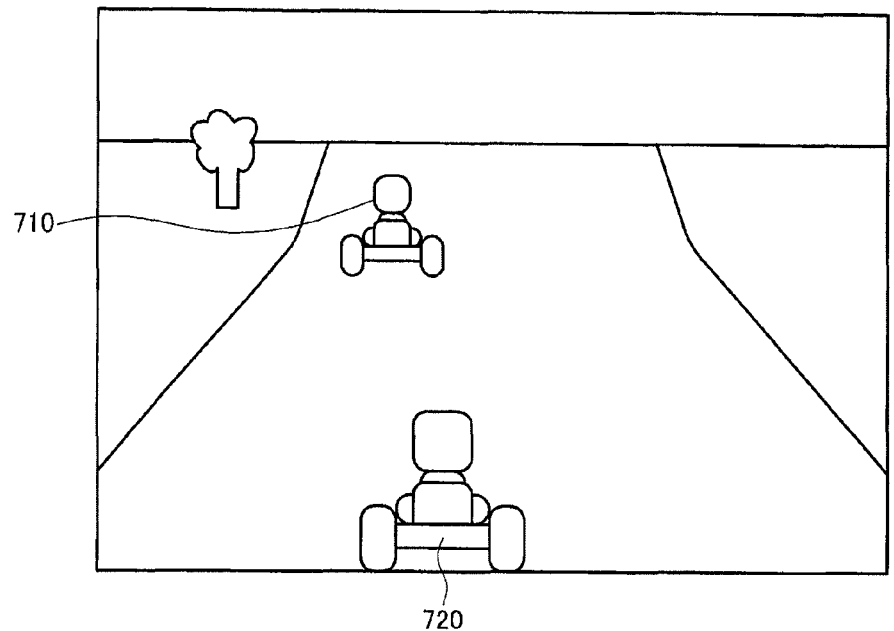
FIGS. 14A and 14B illustrate an example of a game screen (image) when a union event occurs.
Figure 14B:
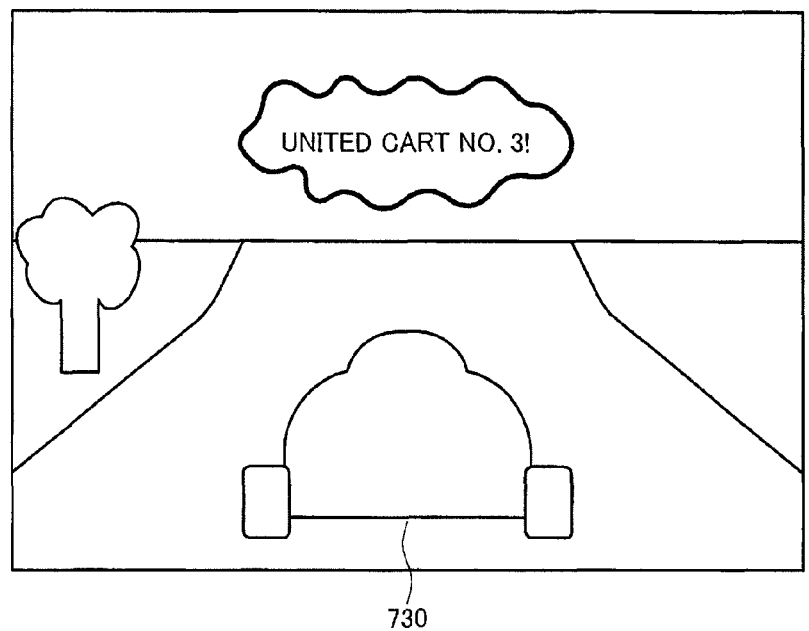

FIGS. 14A and 14B illustrate an example of a game screen (image) when the union event occurs. Reference sign 720 indicates the player object POB2 operated by the player P2, and reference sign 710 indicates the player object POB1 operated by the player P1. When the player has performed a union event generation instruction input, the player object POB2 (720) operated by the player P2 and the player object POB1 (710) operated by the player P1 disappear, and the united object (730) is displayed.

3-6. Placement Position of United Object

Figure 10:
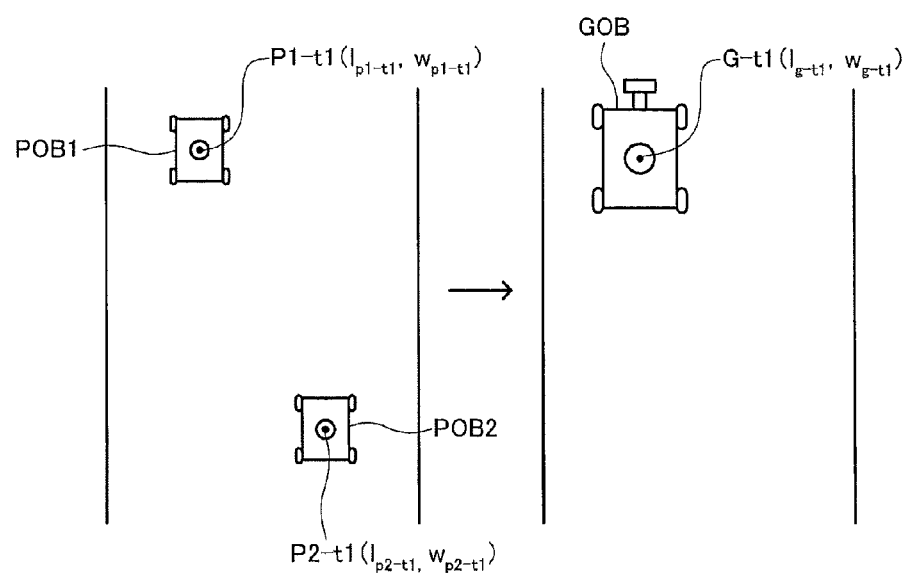
FIG. 10 illustrates the placement position of a united object.

FIG. 10 illustrates the placement position of the united object.

In the embodiments of the invention, the relative advantage of the positions of the player objects operated by a plurality of players who form a team that performs the cooperative play before the union event has occurred is determined based on a given rule, and the placement position of the united object is determined based on the most advantageous position.

For example, when the game is a racing game, the preceding position (i.e., a position at which the distance to the goal along the racetrack is shorter than the other) is an advantageous position in the game. When the players P1 and P2 form a team, and the player object POB1 operated by the player P1 precedes the player object POB2 operated by the player P2, the united object GOB may be disposed at the position of the player object POB1 that is considered to be advantageous as compared with the position of the player object POB2. Specifically, when the coordinates of the position of the player object POB1 when the union event has occurred (time t1) are P1-t1($l_{pt\text{-}t1}$, $w_{p1\text{-}t1}$), the coordinates of the position of the player object POB2 when the union event has occurred (time t1) are P2-t1($l_{p2\text{-}t1}$, $w_{p2\text{-}t1}$), and the coordinates of the position of the united object GOB are G-t1($l_{g\text{-}t1}$, $w_{g\text{-}t1}$), the coordinates G-t1($l_{g\text{-}t1}$, $w_{g\text{-}t1}$) may be set to the coordinates P1-t1($l_{p1\text{-}t1}$, $w_{p1\text{-}t1}$).

The union flag (350 in FIG. 7A) linked to the player identification information may be set to ON when the union event has occurred.

When the union flag is set to ON (i.e., the cooperative play state is enabled), the movement, the operation (e.g., shooting operation), and the like of the united object are controlled, and the position of the united object GOB is calculated based on the operation input performed by a plurality of players (e.g., players P1 and P2) who form a team that performs the cooperative play.

Note that the relative advantage of the position of the player object is determined depending on the characteristics of the game. For example, when the game is a racing game, the preceding position is an advantageous position in the game. When the game is a shooting game, a safe position, a position where a number of targets exist, or a position where a number of weak enemies exist is an advantageous position in the game.

According to the above configuration, a player who follows his teammate (i.e., a player situated at a disadvantageous position) in a racing game can travel the united object from the preceding position (i.e., advantageous position) upon occurrence of the union event.

3-7. Performance of United Object

The performance of the united object (i.e., the parameter or the item of the united object) may be determined based on the points (i.e., parameter) or the united cart (i.e., item) possessed by at least one player of the team that performs the cooperative play.

When the player object and the united object are moving objects, the performance of the united object may be the traveling performance of the moving object. When the united object is a moving object, the traveling performance of the united object refers to the acceleration, the moving speed, the maximum speed, and the like of the united object. When the player object and the united object are shooting characters, the performance of the united object may be the shooting performance of the united object. The shooting performance of the united object refers to the shooting destructive power, the hit probability, and the like of the united object. When the player object and the united object are fighting characters, the performance of the united object may be the fighting performance of the united object.

In the embodiments of the invention, since the united object has the moving function and the shooting function, the performance of the united object may be the traveling performance and the shooting performance.

The united object that appears when a plurality of players perform the cooperative play may be a united cart possessed by one of the team members. For example, a united cart having the best performance among the united carts possessed by the members of the team that performs the cooperative play may be used as the united object.

The points or the united cart possessed by the player may be points or the united cart acquired during the previous game. For example, a united cart (i.e., item) having traveling performance and shooting performance corresponding to the points acquired during the previous game may be given to the player. The points or the united cart acquired during the previous game is stored in the management server as the game history information about the player while being linked to the player identification information.

For example, when the player P1 possess a united cart No. 3, the player P2 possess a united cart No. 1, and the performance of the united cart No. 3 is higher than that of the united cart No. 1, the united cart No. 3 may be used as the united object.

According to the above configuration, a player who possesses a united cart having low performance as compared with the united cart possessed by his teammate can enjoy the game using a united cart having higher performance possessed by his teammate upon occurrence of the union event.

3-8. Control of United Object

The movement/operation and the like of the united object may be controlled using the average value of the input information input by a plurality of players, or the average value of the input information input by a plurality of players that is weighted using a given weight. For example, when the players P1 and P2 perform the cooperative play, and the movement of the united object is controlled by operating a steering wheel, the travel of the united object may be controlled based on the average value of the input information due to the steering wheel operations performed by the players P1 and P2 (or the average value of the input information due to the steering wheel operations performed by the players P1 and P2 that is weighted using a given weight).

The united object may be controlled using the most appropriate input information among the input information input by a plurality of players. For example, when the players P1 and P2 perform the cooperative play, and the movement of the united object is controlled by operating a steering wheel, the travel of the united object may be controlled based on the input information (steering wheel operation) input by the player P1 or the input information (steering wheel operation) input by the player P2, whichever is more appropriate.

When controlling the united object based on the input information input by a plurality of players during the cooperative play, the plurality of players may control the functions, the movement/operation, and the like of the united object in a sharing manner. For example, when the united object has a first function and a second function, the player P1 may control the first function, and the player P1 may control the second function.

In the embodiments of the invention, since the united object has the moving function and the shooting function, the player P1 may control the moving function, and the player P1 may control the shooting function.

In the embodiments of the invention, the union event occurs when one of the players of the team that performs the cooperative play has issued the union event instruction input. In this case, the player who has issued the union event instruction input may be allowed to control the shooting function of the united object, and the remaining player may be allowed to control the moving function of the united object.

When the player object and the united object are moving objects, each player moves his moving object (player object) before the union event occurs. When one of the players has issued the union event instruction input, the remaining player can smoothly perform the cooperative play when the operation input performed after occurrence of the union event has continuity with the operation input (i.e., movement control) performed before occurrence of the union event. Therefore, when the remaining player is allowed to control the moving function of the united object, the remaining player can smoothly perform the cooperative play.

For example, when the player P2 has generated the union event, the player P2 may perform an operation input for controlling the shooting function of the united object, and the player P1 may perform an operation input for controlling the moving function of the united object.

Figure 11:
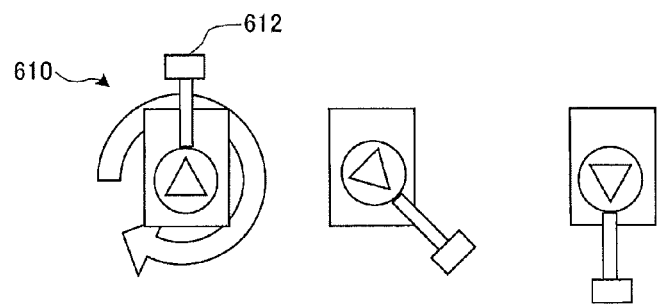
FIG. 11 illustrates control of a shooting function (operation) of a united object.

FIG. 11 illustrates control of the shooting function of the united object. As illustrated in FIG. 11, a united object 610 has a rotatable battery 612, the player who controls the shooting function rotates the battery 612 in the desired direction by operating a steering wheel or the like, and shoots a shell by pressing a button or the like.

3-9. Separation Event

Figure 12:
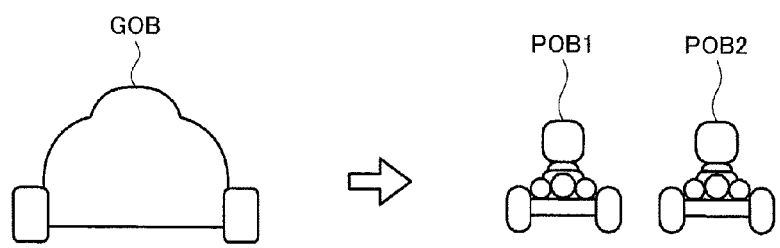
FIG. 12 illustrates a separation event.

FIG. 12 illustrates the separation event.

When the separation event has occurred in a state in which a plurality of players who form a team operate the united object in cooperation, the cooperative play state is canceled, and the player object operated by each player is disposed on the racetrack within the virtual game space instead of the united object.

For example, when the players P1 and P2 form a team, the united object GOB travels on the racetrack within the virtual game space during the cooperative play (after the union event has occurred). When the separation event has occurred in this state, the player object POB1 and the player object POB2 are disposed on the racetrack within the virtual game space instead of the united object GOB. Specifically, the united object GOB is separated into the player object POB1 and the player object POB2 upon occurrence of the separation event.

The separation event may be generated when a given period (time) has elapsed after occurrence of the union event. The given period may be changed depending on the game situation.

Figure 13:
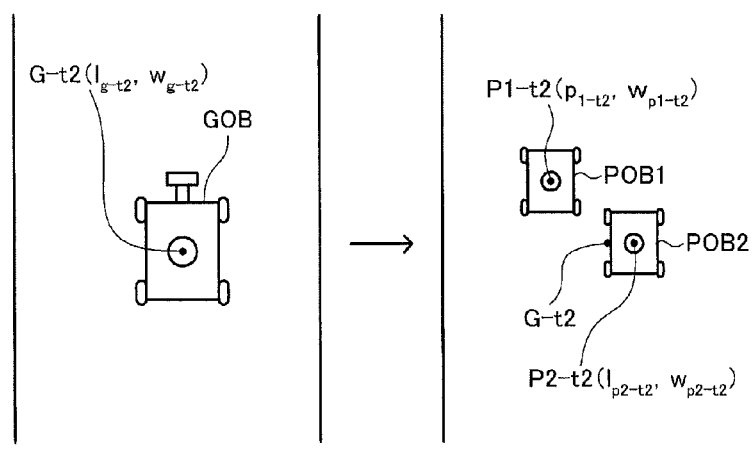
FIG. 13 illustrates the placement position of each player object after occurrence of a separation event.

FIG. 13 illustrates the placement position of each player object after the separation event has occurred.

The position of each player object after the separation event has occurred may be determined based on the position of the united object when the separation event has occurred, and the relative ranking of each player object before occurrence of the union event.

When the player object POB1 and the player object POB2 have been united in the state illustrated FIG. 10, the relative ranking the player object POB1 is higher than that of the player object POB2 before occurrence of the union event. In this case, the positions of the player object POB1 and the player object POB2 may be determined so that the relative ranking the player object POB1 is higher than that of the player object POB2 after occurrence of the union event. For example, when the position of the united object GOB when the separation event has occurred is G-t2($l_{g-t2}$, $w_{g-t2}$), the position P1-t2($l_{p1-t2}$, $w_{p1-t2}$) of the player object POB1 having a higher relative ranking before occurrence of the union event may be set to a position that precedes the position G-t2 of the united object GOB by a given distance, and the position P2-t2($l_{p1-t2}$, $w_{p1-t2}$) of the player object POB2 having a lower relative ranking before occurrence of the union event may be set to a position that follows the position G-t2 of the united object GOB by a given distance.

3-10. Determination of Positional Relationship

The game system according to the embodiments of the invention may determine the positional relationship between the moving object in the game space during a racing game.

When the united object operated by a plurality of players has reached the goal during the cooperative play, it may be determined that the plurality of players have reached the goal at the same time.

3-11. Process that Evaluates Achievement During the Cooperative Play

The play of each player may be evaluated with respect to control of the united object during the cooperative play, and the relative ranking of the player object operated by each player after occurrence of the separation event may be determined based on the evaluation results.

The position of the player object after occurrence of the separation event may be determined so that the relative ranking of the player object after occurrence of the separation event increases when the play of the player is highly evaluated with respect to control of the united object during the cooperative play.

The play of each player during the cooperative play may be evaluated based on a criterion that is set corresponding to the role assigned to each player. For example, when the player P1 controlled the movement of the united object, and the player P2 controlled the shooting operation of the united object, the play of the player P1 may be evaluated in n stages based on a given criterion for determining the level of control of the movement of the united object (highly evaluated when the value is large), and the play of the player P2 may be evaluated in n stages based on a given criterion for determining the level of control of the shooting operation of the united object (highly evaluated when the value is large). The level values of the players P1 and P2 may be compared to evaluate the degree of contribution of each player to the cooperative play. For example, when the movement control evaluation level of the player P1 is 4, and the shooting operation control evaluation level of the player P1 is 2, the degree of contribution of the player P1 to the cooperative play may be determined to be higher than that of the player P2. In this case, the player object operated by the player P1 may be disposed at a preceding position (i.e., advantageous position) as compared with the player object operated by the player P2.

4. Flow of Process According to First Embodiment

The flow of the process performed by the game system according to the first embodiment that determines the position of the player object after occurrence of the separation event based on the relative position of the player object before occurrence of the union event is described below with reference to FIGS. 15, 16, and 17.

The following description is given taking an example in which the cooperative play mode is enabled when all of the players who participate in the multiplayer game have selected the cooperative play mode is enabled (i.e., one team that can perform the cooperative play is formed).

Figure 15:
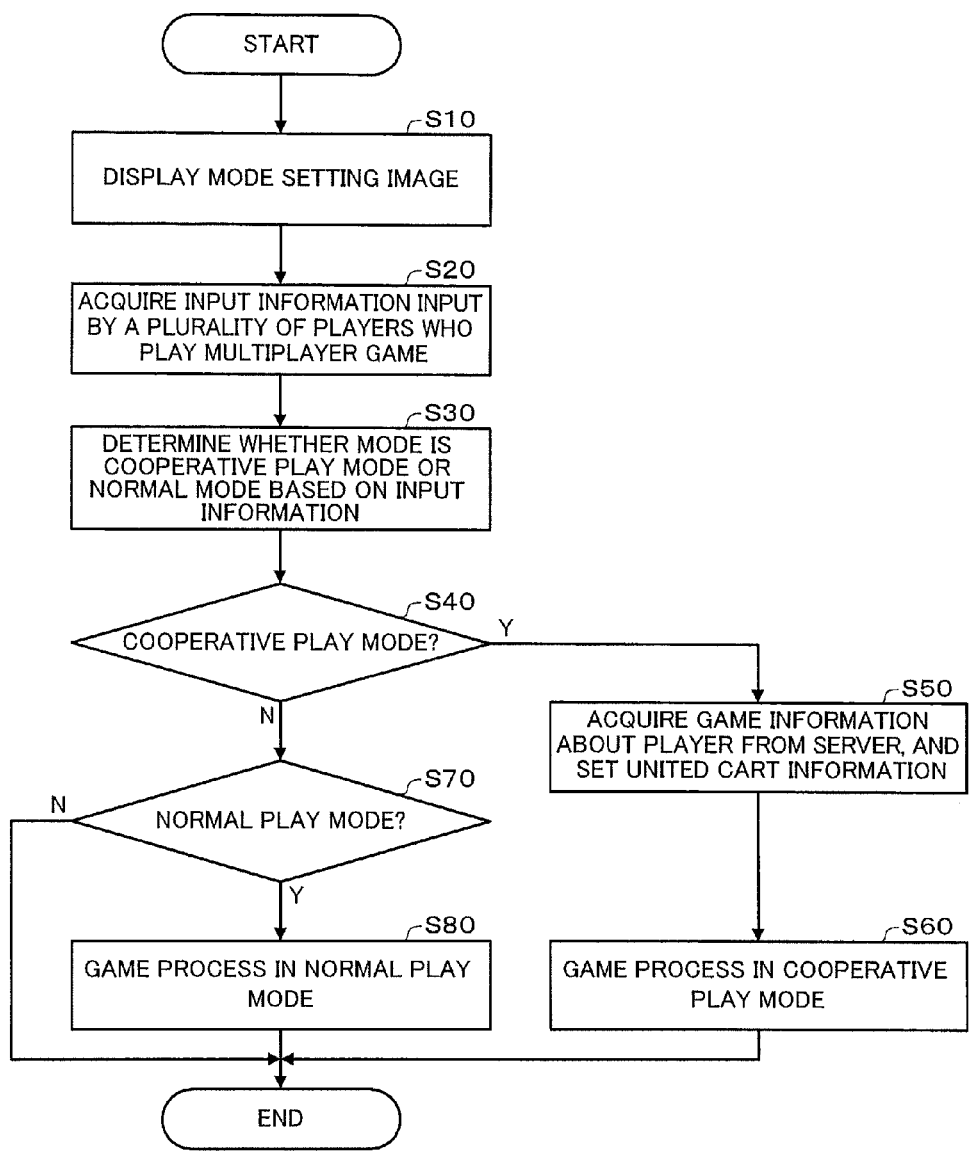
FIG. 15 is a flowchart illustrating the flow of a process that determines whether a mode is a cooperative play mode or a normal play mode.

FIG. 15 is a flowchart illustrating the flow of the process that determines whether the mode is the cooperative play mode or the normal play mode.

In a step S10, a mode setting image is displayed. The mode setting image may be configured to allow the player to select the cooperative play mode or the normal play mode (see FIG. 3). The cooperative play mode is enabled when all of the players who participate in the multiplayer game have selected the cooperative play mode.

The input information input by a plurality of players who play the multiplayer game is acquired (step S20), and whether the mode is the cooperative play mode or the normal mode is determined based on the input information (step S30).

When it has been determined that the mode is the cooperative play mode (step S40), the game information about the player is acquired from the server, and the united cart information is set (step S50). The game process in the cooperative play mode is then performed (step S60).

When it has been determined that the mode is the normal play mode (step S70), the game process in the normal play mode is performed (step S80).

Figure 16:
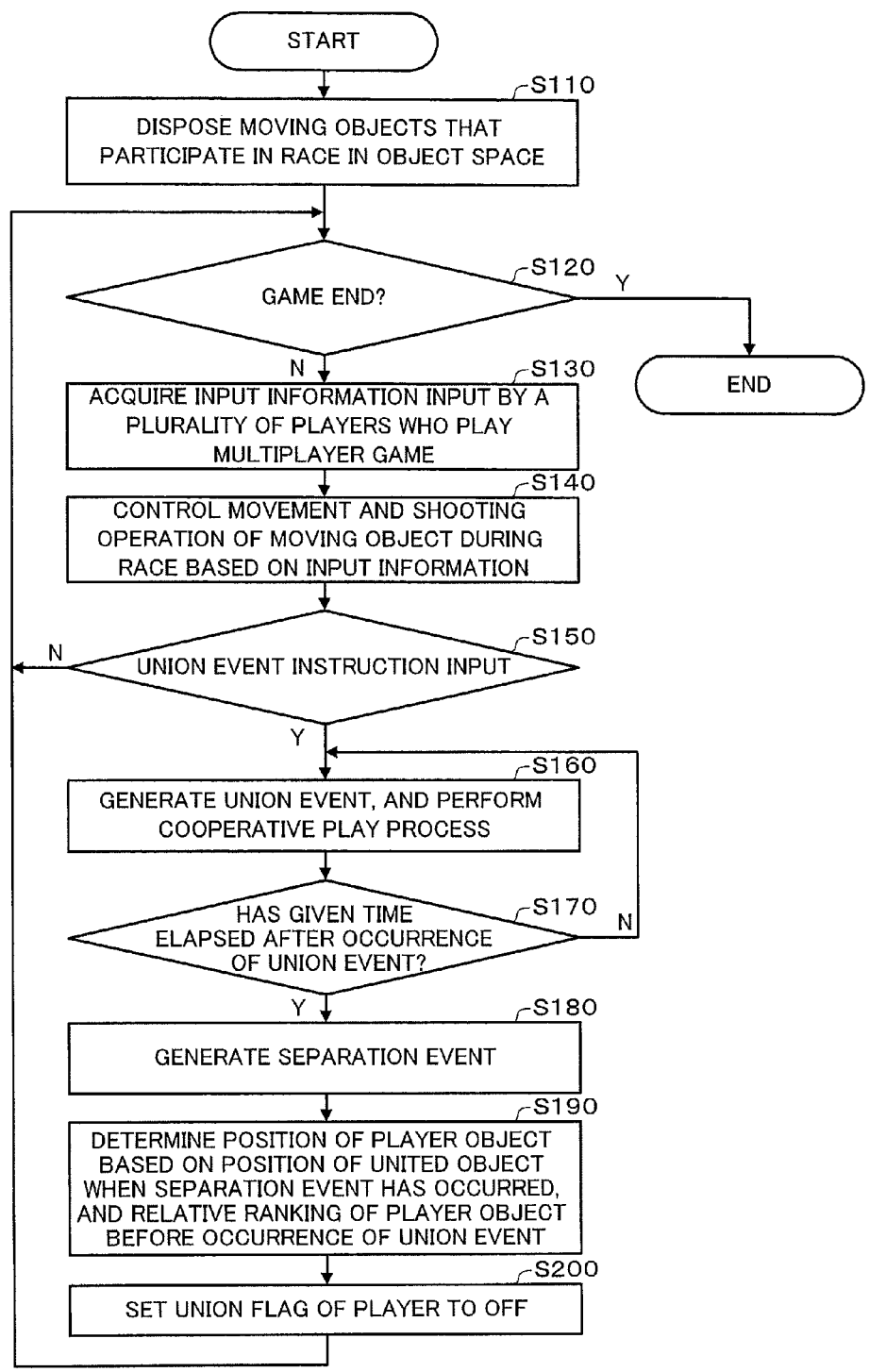
FIG. 16 is a flowchart illustrating an example of a game process in a cooperative play mode.

FIG. 16 is a flowchart illustrating the flow of the game process in the cooperative play mode (when the position of the player object after occurrence of the separation event is determined based on the relative position of the player object before occurrence of the union event).

In a step S110, the moving objects that participate in a race are disposed in the object space. The moving objects that participate in a race include the player object operated by the player who plays the multiplayer game, and the computer car that is controlled by the computer.

The following process is performed when the game does not end (step S120).

The input information input by a plurality of players who play the multiplayer game is acquired (step S130), and the movement and the shooting operation of the moving object during the race are controlled based on the input information (step S140).

When one of the players has performed the union event instruction input (step S150), the union event is generated, and the cooperative play process is performed (step S160). When a given time has elapsed after occurrence of the union event (step S170), the separation event is generated (step S180). The position of the player object is determined based on the position of the united object when the separation event has occurred, and the relative ranking of the player object before occurrence of the union event (step S190). For example, the position of each player object may be determined so that the relative ranking of the player object after occurrence of the separation event is equal to the relative ranking of the player object before occurrence of the union event (see FIG. 13). The union flag of the player is then set to OFF (step S200).

Figure 17:
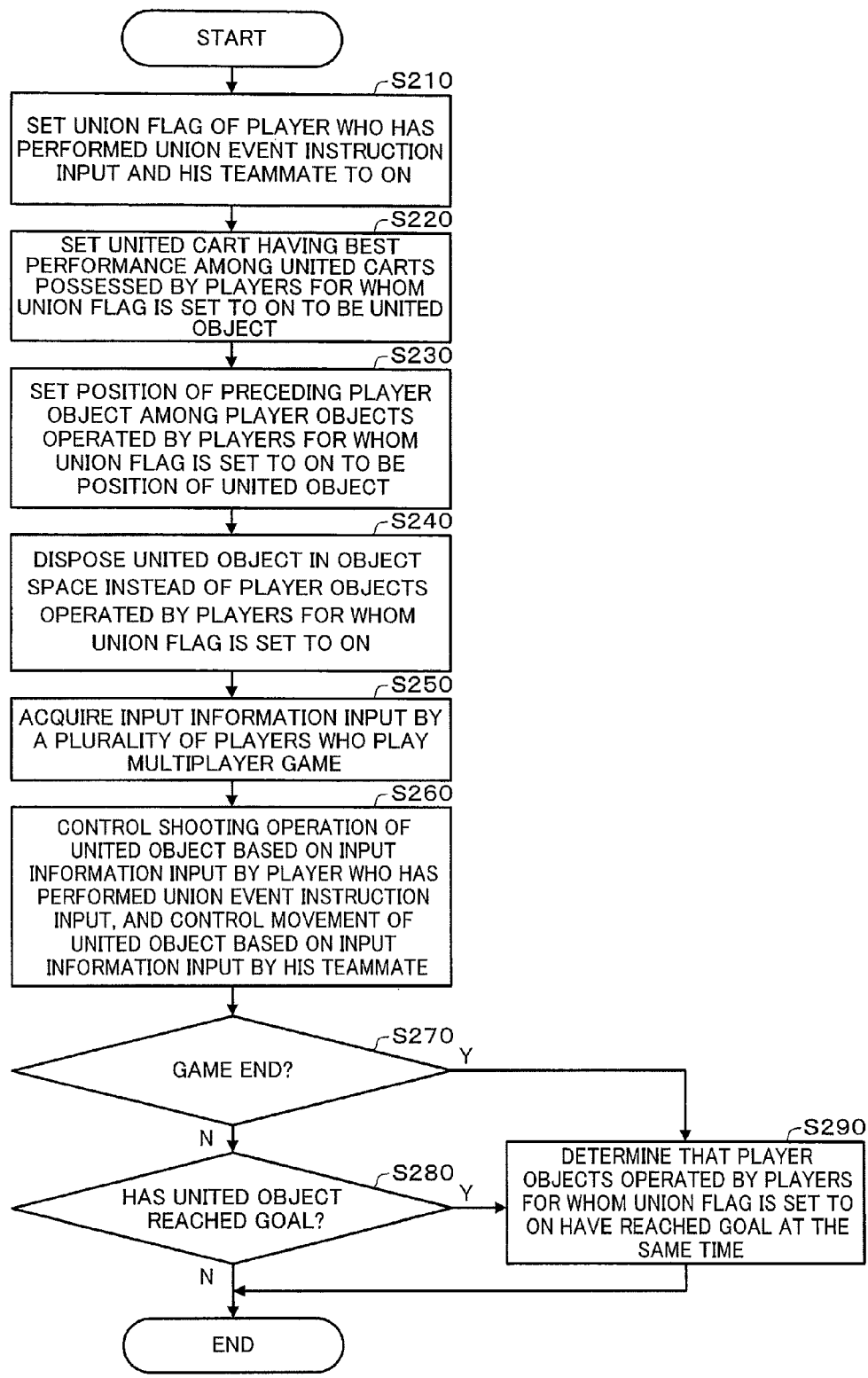
FIG. 17 is a flowchart illustrating the flow of a cooperative play process.

FIG. 17 is a flowchart illustrating the flow of the cooperative play process (see FIG. 15).

The union flag of the player who has performed the union event instruction input and his teammate is set to ON (step S210), and a united cart having the best performance among the united carts possessed by the players for whom the union flag is set to ON is set to be the united object (step S220). The position of the preceding player object among the player objects operated by the players for whom the union flag is set to ON is set to be the position of the united object (step S230). The united object is disposed in the object space instead of the player objects operated by the players for whom the union flag is set to ON (step S240).

The input information input by a plurality of players who play the multiplayer game is acquired (step S250). The shooting operation of the united object is controlled based on the input information input by the player who has performed the union event instruction input, and the movement of the united object is controlled based on the input information input by his teammate (step S260).

When the game ended in a state in which the united object is operated (step S270), or the united object has reached the goal (step S280), it is determined that the player objects operated by the players for whom the union flag is set to ON have reached the goal at the same time (step S290).

5. Flow of Process According to Second Embodiment

The flow of the process performed by the game system according to the second embodiment that determines the position of the player object after occurrence of the separation event based on the achievement by each player during the cooperative play is described below with reference to FIGS. 15, 18, and 17.

The following description is given taking an example in which the cooperative play mode is enabled when all of the players who participate in the multiplayer game have selected the cooperative play mode is enabled (i.e., one team that can perform the cooperative play is formed).

FIG. 15 is a flowchart illustrating the flow of the process that determines whether the mode is the cooperative play mode or the normal play mode. Note that the flow of the process illustrated in FIG. 15 is the same as described above in connection with the first embodiment, and description thereof is omitted.

Figure 18:
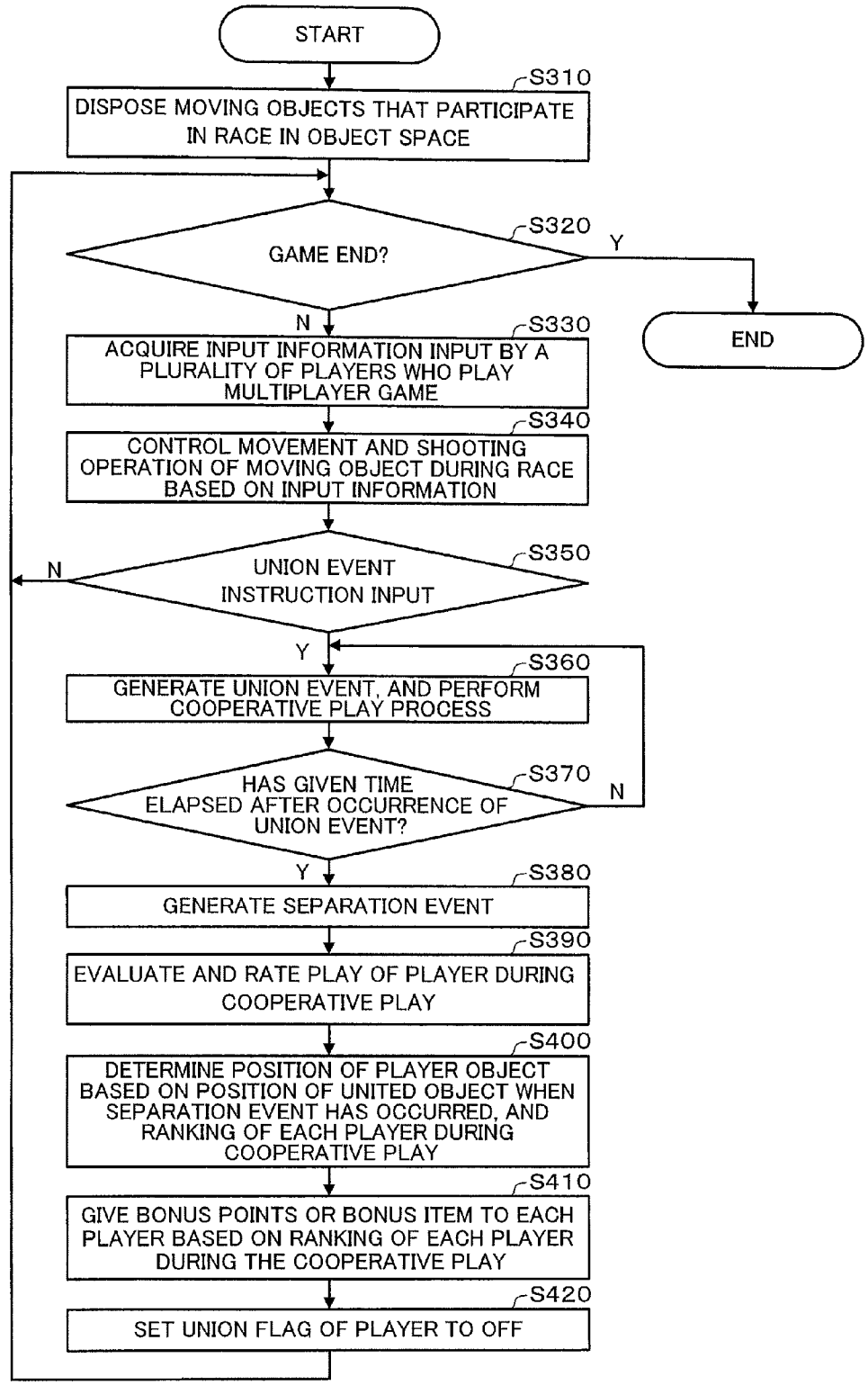
FIG. 18 is a flowchart illustrating another example of a game process in a cooperative play mode.

FIG. 18 is a flowchart illustrating the flow of the game process in the cooperative play mode (when the position of the player object after occurrence of the separation event is determined based on the achievement by each player during the cooperative play).

In a step S110, the moving objects that participate in a race are disposed in the object space. The moving objects that participate in a race include the player object operated by the player who plays the multiplayer game, and the computer car that is controlled by the computer.

The following process is performed when the game does not end (step S320).

The input information input by a plurality of players who play the multiplayer game is acquired (step S330), and the movement and the shooting operation of the moving object during the race are controlled based on the input information (step S140).

When one of the players has performed the union event instruction input (step S350), the union event is generated, and the cooperative play process is performed (step S360). When a given time has elapsed after occurrence of the union event (step S370), the separation event is generated (step S380).

The play of the player during the cooperative play is evaluated, and rated (step S390). The position of the player object is determined based on the position of the united object when the separation event has occurred, and the ranking of each player during the cooperative play (step S400). Bonus points or a bonus item is given to each player based on the ranking of each player during the cooperative play (step S410). The union flag of the player is then set to OFF (step S420).

FIG. 16 is a flowchart illustrating the flow of the cooperative play process (see FIG. 17). Note that the flow of the process illustrated in FIG. 16 is the same as described above in connection with the first embodiment, and description thereof is omitted.

6. Client/Server System

The game system according to the embodiments of the invention can independently can perform each game process. Note that the game system according to the embodiments of the invention may also be applied to a system that includes a server and a plurality of client devices (hereinafter referred to as "client/server system").

Figure 19:
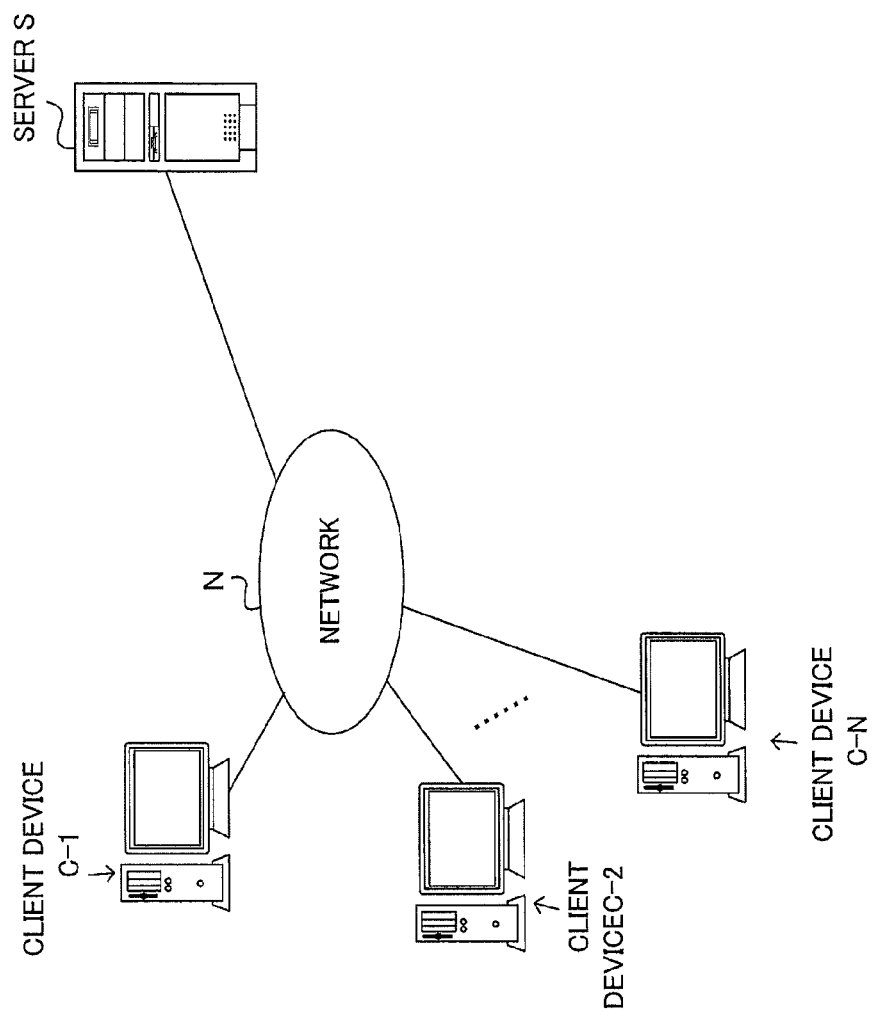
FIG. 19 illustrates the configuration of a client/server system.

As illustrated in FIG. 19, the client/server system includes a server S that performs a basic game process, and a plurality of client devices C (C-1, C-2, . . . , and C-N) that receive operation data from each player who participates in a racing game, and exchange necessary data and instructions with the server S.

For example, the server S performs data communication with the client devices C using a broadcast method, and performs various processes necessary when executing the racing game (e.g., a process that starts the game when a game start condition has been satisfied, and a process that proceeds with the game).

Specifically, the server S exchanges a data packet and a command packet with each client device C during the racing game based on identification data that identifies each client device C.

The server S performs various processes (e.g., operation data reception process, individual play process, union event process, cooperative play process, separation event process, evaluation process, and process that transmits the processing results to each client device C) based on identification data that identifies each client device C.

Each client device C transmits the operation data received through the input section 160 to the server S together with the identification data, and receives data relating to the processing results of the server S, and data for drawing a game image output to the display section 190.

7. Peer-to-Peer System

The game system according to the embodiments of the invention can independently can perform each game process. Note that the game system according to the embodiments of the invention may also be applied to a system that includes only a plurality of terminal devices that perform each game process in synchronization (hereinafter referred to as "peer-to-peer system").

Figure 20:
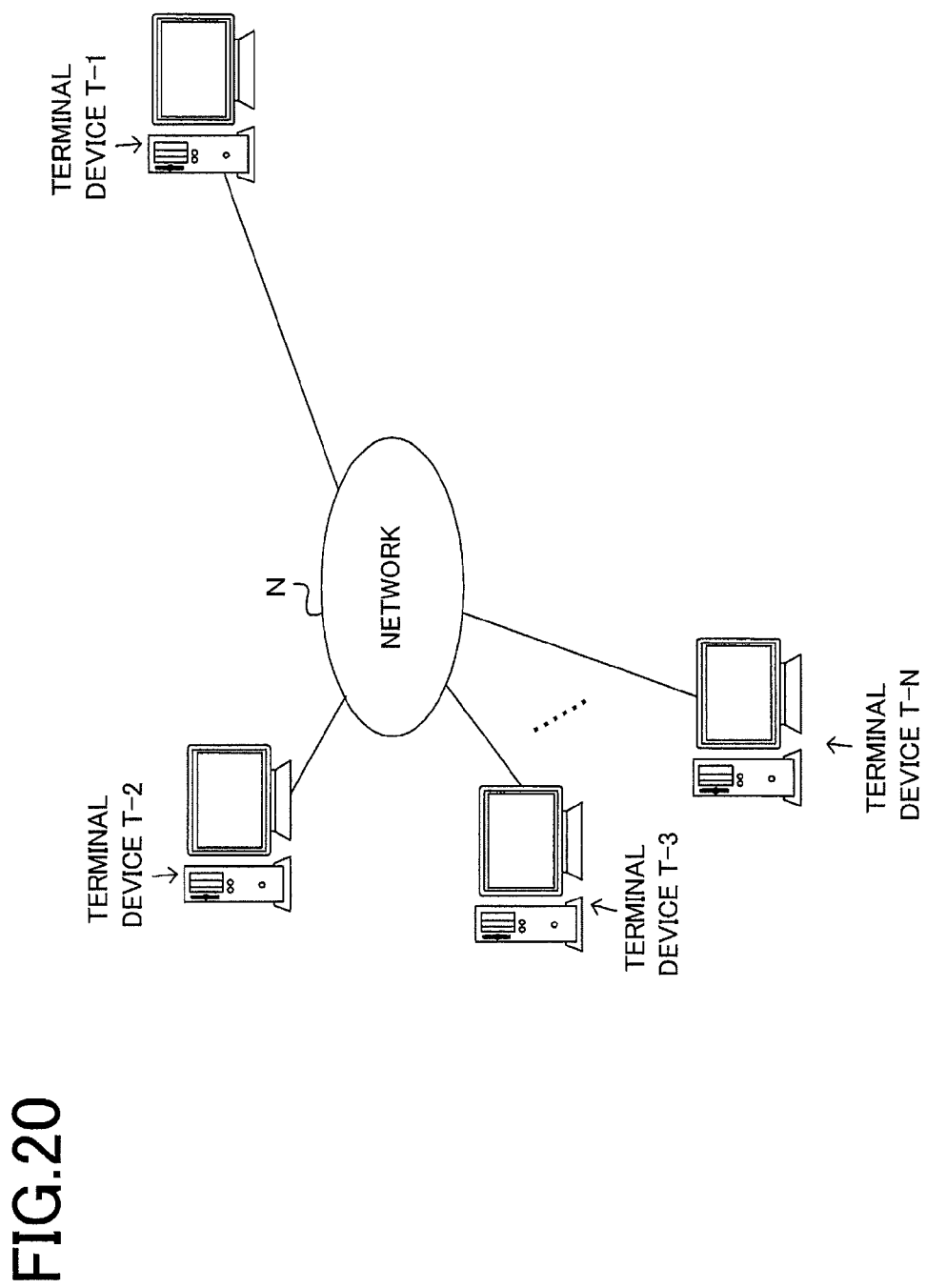
FIG. 20 illustrates the configuration of a peer-to-peer system.

As illustrated in FIG. 20, the peer-to-peer system includes a plurality of terminal devices T (T-1, T-2, T-3, . . . , and T-N) that exchange necessary data and commands, and can be controlled to perform each game process in synchronization.

Each terminal device T performs various processes necessary when executing the racing game (e.g., a process that starts the game when a game start condition has been satisfied, and a process that proceeds with the game) in synchronization with other terminal devices T.

Specifically, each terminal device T exchanges a data packet and a command packet during the racing game based on the identification data (including group setting information) that identifies each terminal device T, and performs various processes (e.g., operation data reception process, individual play process, union event process, cooperative play process, separation event process, evaluation process, and process that transmits the processing results to each terminal device T) based on the identification data.

Each terminal device T performs various game processes based on operation data when the operation data of the player has been input to each terminal device T through the input section 160, and transmits the input operation data to other terminal devices T.

Each terminal device T moves the corresponding moving object in the object space based on the operation data input through the input section 160, and moves other moving objects in the object space based on the operation data transmitted from other terminal devices T.

Specifically, each terminal device T included in the peer-to-peer system receives the operation data of the moving objects other than the corresponding moving object from other terminal devices T, and performs various game processes based on the operation data input through the input section 160 and the received operation data.

Although the peer-to-peer system is configured so that each terminal device T performs various game processes based on the operation data input through the input section 160 and the received operation data, each terminal device T can also exchange data relating to other processes (e.g., individual play process, union event process, cooperative play process, separation event process, and evaluation process).

Although the above embodiments have been described taking a racing game in which the player operates a car as an example, the embodiments of the invention may also be applied to various other games such as a shooting game and a fighting game, for example.

The invention may be applied to various games. The invention may be applied to various image generation systems such as an arcade game system, a consumer game system, a large-scale attraction system in which a number of players participate, a simulator, a multimedia terminal, a system board which generates a game image, and a mobile phone.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A networked game system that implements a real-time multiplayer game, the networked game system comprising:
 a network communication interface configured to communicate with a plurality of user terminals over a network; and
 a processor programmed to:
   dispose, via the network, in a real-time virtual environment of the multiplayer game, which can be displayed by the user terminals, a plurality of player objects associated with a plurality of players;
   control, in the real-time Virtual environment of the multiplayer game, the player objects based on input received from the respective user terminals of the associated players;
   determine whether a union event has occurred during the multiplayer game; and
   when the union event has occurred during the multiplayer game:
     determine a relative positional advantage with respect to a specific criterion or goal of the multiplayer game between at least two of the plurality of player objects corresponding respectively to at least two united players or teammates of the plurality of players;
     determine a placement position of a united object, in the real-time virtual environment of the multiplayer game, based on the determined relative positional advantage;
     dispose, in the real-time virtual environment of the multiplayer game, the united object based on the determined placement position;
     set the at least two united players or teammates to a cooperative play state; and
     control, in the real-time virtual environment of the multiplayer game, the united object based on input received from the respective user terminals of the at least two united players or teammates while the cooperative play state is set for the at least two united players or teammates.

2. The game system as defined in claim 1, wherein the processor is further programmed to determine a parameter or an item of the united object based on a parameter or an item of at least one of the at least two united players or teammates.

3. The game system as defined in claim 1, wherein the processor is further programmed to:
 assign a role of controlling at least one of movement and operation of the united object respectively to each of the plurality of players, and
 control, in the virtual environment, at least one of the movement and the operation of the united object corresponding to the role assigned to each of the plurality of players based on the input received from the respective user terminal by each of the plurality of players.

4. The game system as defined in claim 1, wherein the processor is further programmed to:
 cancel the cooperative play state of the at least two united players or teammates while the cooperative play state is set for the at least two united players or teammates, when a separation event has occurred, and
 dispose, in the virtual environment, the player objects respectively associated with at least two united players or teammates instead of the united object.

5. The game system as defined in claim 4, wherein the processor is further programmed to determine that the separation event has occurred, when a given time has elapsed after occurrence of the union event.

6. The game system as defined in claim 1, wherein the processor is further programmed to generate the union event based on input received from the respective user terminal by a player among the plurality of players.

7. The game system as defined in claim 1, wherein the player objects and the united object are moving objects,
 the multiplayer game is a racing game in which the moving objects move on a racetrack within the virtual environment of the multiplayer game, and
 the processor is further programmed to:
   move the moving objects in the virtual environment of the multiplayer game based on a travel performance set to the respective moving objects; and
   determine a positional relationship between the moving objects in the virtual environment of the multiplayer game.

8. The game system as defined in claim 7, wherein the processor is further programmed to determine that the at least two united players or teammates have reached a goal at the same time when the united object has reached the goal during the racing game.

9. The game system as defined in claim 7, wherein the processor is further programmed to:
 determine the positions of the player objects respectively associated with the plurality of players after occurrence of the separation event based on a position of the united object when the separation event has occurred, and
 determine a relative ranking of the player objects respectively associated with the plurality of players before occurrence of the union event.

10. The game system as defined in claim 7, wherein the processor is further programmed to:
 evaluate play of each of the at least two united players or teammates with respect to control of the united object in the cooperative play state,
 determine the positions of the player objects respectively operated by the plurality of players after occurrence of the separation event, based on a position of the united object when the separation event has occurred, and
 determine an evaluation result for the play of each of the at least two united players or teammates in the cooperative play state.

11. The game system as defined in claim 1, wherein the processor is further programmed to:
 control movement of the united object based on the input received from the respective user terminal by a first player among the at least two united players or teammates, and
 control an attack operation of the united object based on the input received from the respective user terminal by a second player among the at least two united players or teammates.

12. The game system as defined in claim 1, wherein the processor is further configured to generate the union event when the multiplayer game is executed in a given mode.

13. The game system as defined in claim 1, wherein the processor is further programmed to determine the relative positional advantage of the player object based on: when the multiplayer game is a racing game, a preceding position being an advantageous position in the multiplayer game.

14. The game system as defined in claim 1, wherein the processor is further programmed to determine the relative positional advantage of the player object based on: when the game is a shooting game, at least one of: a safe position, a position where a number of targets exist, or a position where a number of weak enemies exist as an advantageous position in the game.

15. The game system as defined in claim 1, wherein the movement of the united object is controlled using an average value of the input received from the at least two united players or teammates, or an average value of the input received from the at least two united players or teammates after being weighted using a predetermined weight.

16. A non-transitory information storage medium storing a program for implementing a networked multiplayer game, the program, when executed, causing a processor of a networked game system that is coupled to a network communication interface configured to communicate with a plurality of user terminals over a network to:
dispose, via the network, in a real-time virtual environment of the multiplayer game, Which can be displayed by the user terminals, a plurality of player objects associated with a plurality of players;
control, in the real-time virtual environment of the multiplayer game, the player objects based on input received from the respective user terminals of the associated players;
determine whether a union event has occurred during the multiplayer game; and
when the union event has occurred during the multiplayer game:
determine a relative positional advantage with respect to a specific criterion or goal of the multiplayer game between at least two of the plurality of player objects corresponding respectively to at least two united players or teammates of the plurality of players;
determine a placement position of a united object, in the real-time virtual environment of the multiplayer game, based on the determined relative positional advantage;
dispose, in the real-time virtual environment of the multiplayer game, the united object based on the determined placement position;
set the at least two united players or teammates to a cooperative play state; and
control, in the real-time virtual environment of the multiplayer game, the united object based on input received from the respective user terminals of the at least two united players or teammates while the cooperative play state is set for the at least two united players or teammates.

17. A networked game processing method that implements a real-time multiplayer game, the networked game processing method comprising:
communicating by a processor, over a network via a network communication interface, with a plurality of user terminals;
disposing, by the processor via the network, in a real-time virtual environment of the multiplayer game, which can be displayed by the user terminals, plurality of player objects associated with a plurality of players;
controlling, by the processor in the real-time virtual environment of the multiplayer game, the player objects based on input received from the respective user terminals of the associated players;
determining, by the processor, whether a union event has occurred during the multiplayer game; and
when the processor determines that the union event has occurred during the multiplayer game:
determining, by the processor, a relative positional advantage with respect to a specific criterion or goal of the multiplayer game between at least two of the plurality of player objects corresponding respectively to at least two united players or teammates of the plurality of players;
determining, by the processor, a placement position of a united object, in the real-time virtual environment of the multiplayer game, based on the determined relative positional advantage;
disposing, by the processor in the real-time virtual environment of the multiplayer game, the united object based on the determined placement position
setting, by the processor, the at least two united players or teammates to a cooperative play state; and
controlling, by the processor in the real-time virtual environment of the multiplayer game, the united object based on input received from the respective user terminals of the at least two united players or teammates while the cooperative play state is set for the at least two united players or teammates.

18. A game system that implements a real-time multiplayer game, the game system comprising:
an interface that receives inputs from a plurality of input devices of each of a plurality of players; and
a processor programmed to:
dispose, in a real-time virtual environment of the multiplayer game, which can be displayed in a display, a plurality of player objects associated with the plurality of players;
control, in the real-time virtual environment of the multiplayer game, the player objects based on input received from the respective input devices of the associated players;
determine whether a union event has occurred during the multiplayer game; and
when the union event has occurred during the multiplayer game:
determine a relative positional advantage with respect to a specific criterion or goal of the multiplayer game between at least two of the plurality of player objects corresponding respectively to at least two united players or teammates of the plurality of players;
determine a placement position of a united object, in the real-time virtual environment of the multiplayer game, based on the determined relative positional advantage;
dispose, in the real-time virtual environment of the multiplayer game, the united object based on the determined placement position;
set the at least two united players or teammates to a cooperative play state; and
control, in the real-time virtual environment of the multiplayer game, the united object based on input received from the respective user terminals of the at least two united players or teammates while the cooperative play state is set for the at least two united players or teammates.

* * * * *